United States Patent [19]
Watanabe et al.

[11] Patent Number: 6,166,143
[45] Date of Patent: Dec. 26, 2000

[54] THERMOPLASTIC ELASTOMER COMPOSITION, HOSE COMPRISING THERMOPLASTIC ELASTOMER COMPOSITION AND PROCESS OF PRODUCTION THEREOF

[75] Inventors: Jiro Watanabe; Yuichi Hara; Daisuke Irii; Takashi Satoh; Gou Kawaguchi; Shigeru Yamauchi; Susumu Hatanaka, all of Hiratsuka; Noriaki Kuroda, Kawasaki, all of Japan

[73] Assignee: The Yokohama Rubber Co., Ltd., Tokyo, Japan

[21] Appl. No.: 09/101,204

[22] PCT Filed: Oct. 31, 1997

[86] PCT No.: PCT/JP97/03987

§ 371 Date: Jul. 2, 1998

§ 102(e) Date: Jul. 2, 1998

[87] PCT Pub. No.: WO98/20068

PCT Pub. Date: May 14, 1998

[30] Foreign Application Priority Data

Nov. 6, 1996 [JP] Japan ..................... 8-293585
Feb. 19, 1997 [JP] Japan ..................... 9-34724
Mar. 10, 1997 [JP] Japan ..................... 9-54676
Sep. 2, 1997 [JP] Japan ..................... 9-236859

[51] Int. Cl.$^7$ ..................... C08L 37/00; C08L 51/06; B32B 1/08
[52] U.S. Cl. ..................... 525/208; 525/65; 525/221; 525/387; 428/36.8; 428/36.91; 428/500
[58] Field of Search ..................... 525/208, 221, 525/65, 387, 74; 428/36.8, 36.91, 500

[56] References Cited

U.S. PATENT DOCUMENTS 3,642,532  2/1972  Greene ..................... 117/233
4,820,774  4/1989  Takao et al. ..................... 525/208
4,880,036  11/1989 Kitami et al. ..................... 428/474.7
5,380,571  1/1995  Ozawa et al. ..................... 428/36.9
5,721,314  2/1998  Hausmann ..................... 525/74

FOREIGN PATENT DOCUMENTS 0 177 151   4/1986   European Pat. Off. .
0 299 486   1/1989   European Pat. Off. .
0 335 394   10/1989  European Pat. Off. .
62-174242   7/1987   Japan .
7-126452    5/1995   Japan .
9-112756    5/1997   Japan .
9-124846    5/1997   Japan .

*Primary Examiner*—Tae Yoon
*Attorney, Agent, or Firm*—Finnegan, Henderson, Farabow, Garrett & Dunner, L.L.P.

[57] ABSTRACT

A thermoplastic elastomer composition containing a component (A) (thermoplastic polyolefin resin), component (B) (epoxy-group-containing ethylene acrylic ester copolymer rubber), and component (C) (acid-modified polyolefin resin) comprising a continuous phase of the component (A) in which the component (B) is dispersed as a dispersed phase and is cross-linked by a peroxide; a thermoplastic elastomer composition comprising a continuous phase of a thermoplastic polyolefin resin (A) and a dispersed phase of an epoxy-group-containing ethylene-acrylic ester copolymer rubber component (B) and acrylonitrile butadiene rubber component (C), which is dynamically cross-linked; and a hose having an inner tube, at least one reinforcing layer, and an outer cover, wherein the inner tube and the outer cover contain a thermoplastic elastomer composition comprised of a thermoplastic resin in which is blended an at least partially cross-linked elastomer component, the reinforcing layer is a brass-plated wire, and the reinforcing layer and inner tube and the reinforcing layer and outer cover have between them a maleic-acid-modified polyolefin thermoplastic resin.

6 Claims, 2 Drawing Sheets

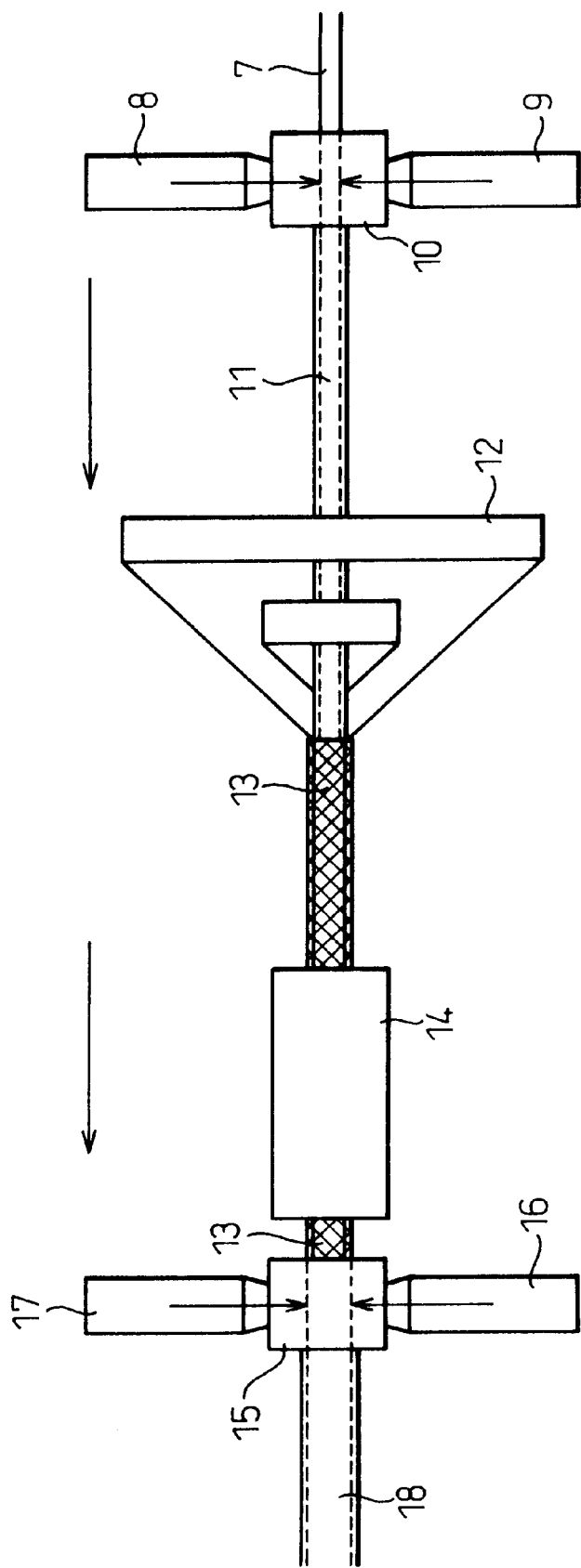

THERMOPLASTIC ELASTOMER COMPOSITION, HOSE COMPRISING THERMOPLASTIC ELASTOMER COMPOSITION AND PROCESS OF PRODUCTION THEREOF

TECHNICAL FIELD

The present invention relates to a thermoplastic elastomer composition superior in heat resistance, oil resistance, low compression set or heat aging characteristics, weatherability, low temperature properties, and oil resistance and a hose using that thermoplastic elastomer composition. Further, the present invention relates to a hose having with a strong bond between the thermoplastic elastomer composition and brass-plated wire reinforcing layer and superior in durability and flexibility.

BACKGROUND ART

Known in the art are hoses comprising an inner tube, a reinforcing layer, and an outer cover laminated on each other annularly in that order. In these hoses, the inner tube and outer cover are comprising a vulcanized rubber, or resin such as urethane, polyester, nylon, the reinforcing layer is composed of a fiber such as nylon, polyester, rayon, vinylon, aramide fiber, braided or spiralled, and the layers are treated to be bonded with each other using a rubber cement, urethane adhesive, etc.

However, a so-called "rubber hose" using rubber for the inner tubes and outer covers requires a vulcanization step, and therefore the manufacturing process ends up becoming complicated. Further, a so-called "plastic hose" using just a thermoplastic resin for the inner tubes and outer covers has the problem that the hose is rigid and poor in flexibility and kinks when the hose is bent.

As a proposal to solve the above problem, there has been proposed a hose using a thermoplastic elastomer composition comprising a thermoplastic resin such as a polyolefin thermoplastic resin, a polyvinyl chloride thermoplastic resin, a polyamide thermoplastic resin, a polyester thermoplastic resin, in which an at least partially cross-linked vulcanized rubber phase is dispersed (see for example Japanese Unexamined Patent Publication (Kokai) No. 6-64102).

However, from the viewpoint of an oil resistant hose, since a general polyolefin thermoplastic elastomer composition comprises a polypropylene and an ethylene-propylene rubber and has no polar group in its molecular structure, it has the defect of being poor in oil resistance. On the other hand, to improve the oil resistance, thermoplastic elastomers comprises polypropylenes and acrylonitrile-butadiene rubbers and thermoplastic elastomers comprises ethylene-acrylic ester copolymer rubbers and polyolefins have been proposed, but while the former are superior in oil resistance, they have double bonds in the molecular structure, and therefore, have the defects of inferior heat resistance and weatherability, while the latter are superior in heat resistance and weatherability, but have ethylene portions in the molecular structure of the rubber, and therefore, have the defect of a continued insufficient oil resistance.

To solve these problems, various studies have been made on thermoplastic elastomers comprising acrylic rubbers and polyolefin resins superior in oil resistance and heat resistance, but there is the problem that they lack compatibility.

Japanese Unexamined Patent Publication (Kokai) No. 6-136190 discloses a thermoplastic elastomer comprising a thermoplastic polyolefin resin and an acrylic ester containing a nonconjugated diene. A polyolefin resin and acrylic rubber are inherently incompatible, but no compatibilizer is used for the thermoplastic elastomer. It is considered that an excess amount of peroxide acts on the polyolefin as well causing the production of a polyolefin having radicals and that these radicals and the nonconjugated diene portions of the acrylic rubber react and produce graft polymers of the two.

Japanese Unexamined Patent Publication (Kokai) No. 7-149964 discloses a thermoplastic elastomer comprising an ethylene-acrylic ester copolymer rubber and an olefin copolymer. No compatibilizer is used for this thermoplastic elastomer as well. The ethylene sites are merely partially cross-linked. The compatibility is unknown. Further, the ethylene-acrylic ester copolymer rubber used here does not have an epoxy group.

Japanese Unexamined Patent Publication (Kokai) No. 62-290741 discloses a thermoplastic elastomer comprising a polyolefin resin and an ethylene-acrylic ester copolymer rubber having an epoxy group. An embodiment using a compatibilizer is also disclosed, but in this thermoplastic elastomer, the epoxy groups are used as cross-linking sites.

On the other hand, a plastic hose comprising an inner tube, a reinforcing layer, and an outer covering layer laminated with each other annularly in that order, using a resin such as a nylon, polyester elastomer, polyacetal, urethane, for the inner tube, using a zinc-plated hard steel wire etc. for the reinforcing layer, and interposing a polyolefin resin layer having a functional group between the layers is disclosed in Japanese Unexamined Patent Publication (Kokai) No. 55-97948. Further, steel wire treated on its surface with a triazine thiol derivative to improve its corrosion resistance and bondability with rubber is disclosed in Japanese Examined Patent Publication (Kokoku) No. 7-122225. However, until now, no example has been known of use of these techniques for a thermoplastic elastomer composition comprising a thermoplastic resin in which is dispersed a cross-linked elastomer.

On the other hand, a process for the production of a wire-reinforced plastic hose having two wire reinforcing layers sandwiching a bonding use sheet coated with an epoxy resin etc. or a synthetic resin sheet between the hose inner layer and outer covering where after the wires are covered, induction heating is applied to bond the wires and bonding use sheet and outer covering is disclosed in Japanese Unexamined Patent Publication (Kokai) No. 54-159468.

These related art relate to hoses using a nylon, polyester, polyurethane, or other resin for the inner tube and outer cover and to processes of production of such plastic hoses. Hoses using a nylon, polyester, polyurethane, or the like, however, were not sufficient in flexibility or durability.

Until now, no wire-reinforced hose using a thermoplastic elastomer composition comprising a thermoplastic resin in which is dispersed a cross-linked elastomer was known. Development of a wire-reinforced hose using a thermoplastic resin flexible and superior in durability has therefore been desired.

DISCLOSURE OF INVENTION

Accordingly, an object of the present invention is to provide a thermoplastic elastomer composition which has improved compatibility and has a sufficient heat resistance, oil resistance, flexibility, and low compression set and an oil resistant hose using the same.

Another object of the present invention is to provide a process for producing a hose with an inner tube, outer cover, and reinforcing layer strongly bonded, having both an excellent durability and high flexibility, and superior in these properties even under high pressures.

In accordance with the first aspect of the present invention, there is provided a thermoplastic elastomer composition comprising a thermoplastic polyolefin resin (A) in which an epoxy-group-containing ethylene-acrylic ester copolymer rubber (B) is dispersed, which is cross-linked with a peroxide. Further, an acid-modified polyolefin resin (C) is added as a compatibilizer. The compounding ratio (ratio by weight) (A)+(C)/(B) of the components (A), (B), and (C) in the thermoplastic elastomer composition of the present invention is preferably 70/30 to 15/85.

Further, in the thermoplastic elastomer composition of the present invention, the thermoplastic olefin resin (A) is preferably at least one resin selected from the group consisting of a polypropylene and propylene-α-olefin copolymer. The epoxy-group-containing ethylene-acrylic ester copolymer rubber (B) is preferably sufficiently cross-linked. Further, a thermoplastic elastomer composition where the epoxy-group-containing ethylene-acrylic ester copolymer rubber (B) is dynamically cross-linked is preferred.

Further, according to the present invention, there is provided an oil resistant hose using the above thermoplastic elastomer composition.

In accordance with the second aspect of the present invention, there is provided a thermoplastic elastomer composition comprising a continuous phase of a thermoplastic polyolefin resin (A) and a dispersed phase of an epoxy-group-containing ethylene-acrylic ester copolymer rubber component (B) and acrylonitrile butadiene rubber component (D), in which the rubber component is dynamically cross-linked.

The present invention further preferably contains an acid-modified polyolefin resin (C). Further, the ratio of components (ratio by weight) (A)+(C)/(B)+(D) of the components (A)+(C) and (B)+(D) is preferably 70/30 to 20/80 and the ratio of components (ratio by weight) (B)/(D) of the components (B) and (D) is preferably 10/90 to 90/10. Further, the present invention provides a hose containing the above thermoplastic elastomer composition in at least the inner tube.

In accordance with the third aspect of the present invention, there is provided a hose having an inner tube, at least one reinforcing layer, and an outer cover, wherein the inner tube and the outer cover contain a thermoplastic elastomer composition comprising a thermoplastic resin in which an at least partially cross-linked elastomer component is compounded, the reinforcing layer is a brass-plated wire, and the reinforcing layer and inner tube and the reinforcing layer and outer cover have between them a maleic acid-modified polyolefin thermoplastic resin. The brass-plated wire is preferably a brass-plated wire treated with a sulfur-containing triazine compound. Further, there is provided a process for producing a wire-reinforced hose wherein, in the process for producing the hose, the reinforcing layer is provided, then high-frequency induction heating is applied to heat the brass-plated wire and cause the maleic acid-modified polyolefin thermoplastic resin and brass-plated wire to bond.

BRIEF DESCRIPTION OF THE DRAWINGS

The present invention will be explained further below with reference to the drawings, wherein.

FIG. 3 is a schematic view of an example of the process of production of a hose of the present invention.

BEST MODE FOR CARRYING OUT THE INVENTION

Figure 1:
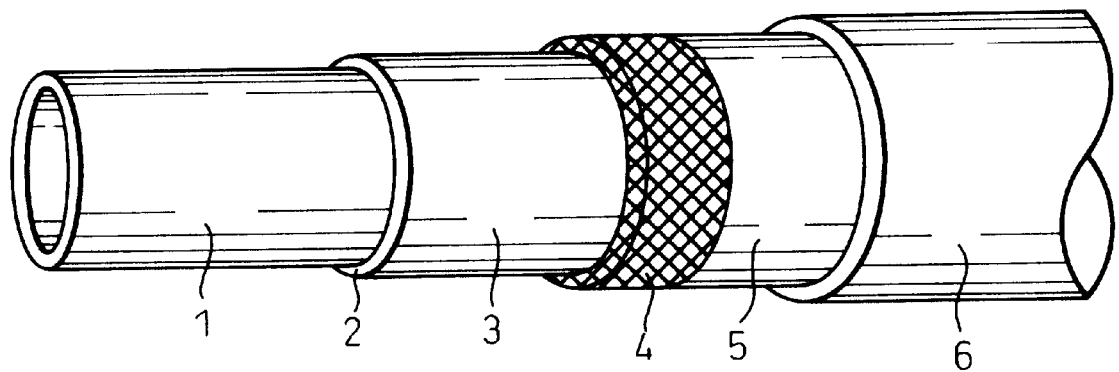
FIG. 1 is a schematic view of an example of the laminar structure of the hose of the present invention.

The present invention will be described in further detail below.

As the thermoplastic polyolefin resin (A) used as the continuous phase in the first aspect of the present invention, a homo or copolymer of an olefin, that is, a homo or copolymer of ethylene, propylene, 1-butene, 1-pentene, 3-methyl-butene, 1-hexene, 3-methyl-1-pentene, 4-methyl-1-pentene, 1-octene, and the like may be mentioned. These may be used alone or in mixtures of two or more types.

Of these, as the polypropylene resin, a polypropylene homopolymer, propylene-ethylene block copolymer containing 2 to 60% by weight of ethylene, a propylene-ethylene random copolymer containing 0.5 to 20% by weight of ethylene, etc. may be mentioned. The melt flow rate of these polymers is 0.1 to 100 g/10 min, preferably 0.5 to 50 g/10 min. Problems arise in processability if the melt flow rate is smaller than 0.1 g/10 min or larger than 100 g/10 min.

The epoxy-group-containing ethylene-acrylic ester copolymer rubber (B) used in the first aspect of the present invention comprising (a) ethylene and (b) an acrylic ester. Methacrylic ester is included in (b) acrylic esters, but these are esters comprised of $C_1$ to $C_8$ alcohols. Specifically, methyl acrylate, methyl methacrylate, ethyl acrylate, ethyl methacrylate, butyl acrylate, butyl methacrylate, t-butyl acrylate, t-butyl methacrylate, 2-ethylhexyl acrylate, 2-ethylhexyl methacrylate, etc. may be given as examples. These may be used alone or in mixtures of two or more types.

The ratio of the (a) ethylene and (b) acrylic ester or methacrylic ester in the epoxy-group-containing ethylene-acrylic ester copolymer rubber (B) used in the present invention is, by molar ratio, 50 to 85:50 to 15, preferably 58 to 80:42 to 20.

If the content of the acrylic ester or methacrylic ester is more than 50 mol %, the embrittlement point becomes higher, and therefore, the use, as an elastomer, at a low temperature becomes difficult. Further, if the content is less than 15 mol %, an elasticity sufficient for a copolymer elastomer is not obtained.

The content of the epoxy groups in the epoxy-group-containing ethylene-acrylic ester copolymer rubber (B) is 0.05 to 5 mol % with respect to the sum of the moles of (a) and (b), preferably 0.1 to 3 mol %.

Note that the above component (B) may be used alone or in combinations of two or more types.

When the epoxy group is used as a cross-linking site, a polycarboxylic acid etc. may be used as the cross-linking agent, but in the present invention, where a peroxide is used to dynamically cross-link the resin component and rubber component, the epoxy group of the rubber component (B) reacts with the resin component or later described compatibilizer and contributes to the compatibilization. In the present invention, the ethylene sites of the component (B) and other components react with the peroxide and function as cross-linking sites.

Since the resin component (A) and rubber component (B) of the present invention are inherently incompatible, the compatibility is raised by adding as a compatibilizer an acid-modified polyolefin resin (C). The acid-modified polyolefin resin (C) used in the present invention is the above polyolefin resin modified with maleic anhydride, fumaric acid, etc. In particular, a maleic acid-modified polypropylene resin is preferred.

The compatibilizer (C) of the present invention reacts with the epoxy groups of the rubber component, that is, the component (B), to form a graft or block polymer. This lowers the surface tension of the rubber component and facilitates mixing with the resin component.

The amounts of the components (A), (B), and (C) blended (ratios by weight) are, when (A)+(B)+(C)=100 parts by weight, [(A)+(C)]/(B)=70/30 to 15/85, preferably [(A)+(C)]/(B)=60/40 to 20/80, particularly preferably 50/50 to 30/70. By compounding the components (A), (B) and (C) in these ranges, it is possible to obtain a thermoplastic elastomer composition having a balance of physical properties.

Further, the ratio of the component (C) based upon the components (A)+(C) is preferably 1 to 50% by weight, particularly preferably 1 to 30% by weight. This is because it is possible to make the resin component (A) and the rubber component (B) sufficiently compatible.

As the peroxide used as the cross-linking agent in the present invention, an organic peroxide having a one-minute half life of at least 150° C. is preferably used. Specifically, 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropylmonocarbonate, t-butylperoxymaleic acid, t-butyperoxy-3,5,5-trimethylhexanoate, t-butylperoxylaurate, 2,5-dimethyl-2,5-di(m-toluylperoxy)hexane, t-butylperoxyisopropylmonocarbonate, t-butylperoxy-2-ethylhexylmonocarbonate, t-hexylperoxybenzoate, 2,5-dimethyl-2,5-di(benzoylperoxy)hexane, t-butylperoxyacetate, 2,2-bis(t-butylperoxy)butane, t-butylperoxybenzoate, n-butyl-4,4-bis(t-butylperoxy) valerate, di-t-butylperoxyisophthalate, α,α' bi(t-butylperoxy)diisopropylbenzene, dicumylperoxide, 2,5-dimethyl-2,5-di(t-butylperoxy)hexane, t-butylcumylperoxide, di-t-butylperoxide, p-menthanehydroperoxide, 2,5-dimethyl-2,5-di(t-butylperoxy)hexine-3, diisopropylbenzenehydroperoxide, t-butyltrimethylsilylperoxide, 1,1,3,3-tetramethylbutylhydroperoxide, cuminhydroperoxide, t-hexylhydroperoxide, t-butylhydroperoxide, etc. may be mentioned.

The thermoplastic elastomer composition according to the present invention is sufficiently cross-linked with the above cross-linking agent. Here, "sufficiently cross-linked" means the gelation rate of the rubber is at least 80%, preferably means it is 85 to 100%, particularly preferably 90 to 100%. If the gelation rate is less than 80%, the low compression set of the thermoplastic elastomer composition obtained is insufficient, and therefore, this is not preferred.

Here, the gelation rate is confirmed by finely pulverizing the obtained composition by freeze pulverization, then performing Soxhlet extraction over a number of stages.

A plasticizer may be added to the thermoplastic elastomer composition of the present invention. The plasticizer used in the present invention is not particularly limited in the case of a paraffin process oil. Further, a napthtene or aroma process oil may be used together therewith. The amount of the paraffin process oil added is 3 to 30 parts by weight based upon 100 parts by weight of the epoxy-group-containing ethylene-acrylate copolymer (B). If the amount is less than 3 parts by weight, the moldability remarkably deteriorates, while if the amount is more than 30 parts by weight, bleeding may occur. Further, when a polyester plasticizer is used, a polypropylene adipate (PPA) or other polyester plasticizer may suitably be used in a compounded state. The amount of the polyester plasticizer added is 3 to 50 parts by weight based upon 100 parts by weight of the epoxy-group-containing ethylene-acrylate copolymer (B). If the amount is less than 3 parts by weight, the moldability remarkably deteriorates, while if the amount is more than 50 parts by weight, bleeding may occur.

Further, the composition of the present invention may further contain, if necessary, compounding agents such as a cross-linking adjuvant, cross-linking accelerator, filler, softening agent, anti-aging agent.

The thermoplastic elastomer composition of the present invention is preferably a thermoplastic elastomer composition which is produced by dynamic cross-linking, that is causing cross-linking of the rubber while mixing the thermoplastic resin and rubber composition, that is, dynamically advancing the cross-linking. By using this process of production, the thermoplastic elastomer composition obtained ends up comprised of a thermoplastic resin phase, at least part of which forms a continuous phase, in which is finely dispersed a cross-linked rubber phase, at least part of which forms a discontinuous phase, therefore the thermoplastic elastomer composition obtained exhibits behavior similar to that of cross-linked rubber. Since at least the continuous phase is a thermoplastic resin, when molding, processing in accordance with the thermoplastic resin becomes possible.

In the process for production of the thermoplastic elastomer composition of the present invention, the machinery used for the mixing of the components (A), (B), and (C) is not particularly limited, but a screw extruder, kneader, Banbury mixer, twin-screw kneader/extruder, etc. may be mentioned. Among these, considering the mixing of the component (A) (resin component), component (B) (rubber composition), and component (C) (compatibilizer) and the dynamic cross-linking of the component (B), use of a twin-screw kneader/extruder is preferred. Further, it is possible to use two or more types of kneaders and to successively mix the mixture.

Next, an example of the process of production will be illustrated in more detail based on mixing by a twin-screw kneader/extruder as is generally performed.

First, the pelletized components (A) and (C) are charged from a first charging port of the twin-screw kneader/extruder, mixed by the twin screws, and heated and melted.

On the other hand, the component (B) is mixed using a Banbury mixer or other rubber use kneader added with, if necessary, a reinforcing agent, anti-aging agent, processing aid etc. to make a so-called master batch, not containing a cross-linking system, which is then pelletized by a rubber use pelletizer. As explained above, the component (A) is heated and melted by the twin-screw kneader/extruder, then the thus pelletized component (B) is charged from a second charging port of the twin-screw kneader/extruder to disperse the component (B) in the component (A).

Next, a cross-linking agent or further a cross-linking aid are charged from a third (fourth) charging port of the twin-screw kneader/extruder to cause the component (B) to cross-link (dynamically cross-link) under mixing.

By performing the cross-linking in this way, the cross-linking can be performed in a state with the component (B)

sufficiently dispersed in the component (A) and with the component (B) sufficiently fine in state, and therefore, a thermoplastic elastomer composition comprising a component (A) forming a continuous phase (matrix) in which a component (B) is stably dispersed as a dispersed phase (domain) is prepared. In such a thermoplastic elastomer composition, the particle size of the cross-linked rubber composition forming the dispersed phase is preferably not more than 50 $\mu$m, more preferably 10 to 1 $\mu$m.

When compounding agents such as a filler, softening agent, anti-aging agent, is added to the composition of the present invention, the compounding agents for the component (B) may be added during the above mixing, but compounding agents other than the cross-linking agent may also be premixed before the above mixing. The compounding agents for the component (A) may be premixed before the above mixing or may be added during the above mixing.

The conditions for the melting and mixing of the component (A), component (B), and component (C) are a mixing temperature of, for example, 150 to 250° C., particularly preferably 150 to 230° C., and a shear rate at the time of mixing of 500 to 7000 sec$^{-1}$, particularly preferably 1000 to 2500 sec$^{-1}$.

The time of the overall melt mixing is 30 seconds to 10 minutes, while the cross-linking time after the cross-linking agent is added is preferably 15 seconds to 5 minutes.

The thermoplastic elastomer composition thus obtained of the present invention is superior in flexibility, low compression set, heat resistance, and oil resistance. The thermoplastic elastomer composition of the present invention is not limited in application to an oil resistant hose and may also be suitably used for parts used near automobile or construction machinery engines requiring oil resistance and heat resistance.

As one example of a hose of the present invention, as shown in FIG. 1, a hose composed of an inner tube 2, reinforcing layer 4, and outer cover 6 may be exemplified. Note that a bonding layer 3 or 5 may be provided between the layers. The hose of the present invention uses the thermoplastic elastomer composition of the present invention for at least one of the inner tube 2 and outer cover 6. Further, when there are a plurality of layers of inner tubes 2 or outer covers 6, the thermoplastic elastomer composition of the present invention may be used for at least one of the same. If the composition of the present invention is used for one of the inner tube 2 and outer cover 6, a hose with the desired performance is obtained, but the composition of the present invention may also be used for both of the inner tube 2 and the outer cover 6.

In the hose of the present invention, when the thermoplastic elastomer composition of the present invention is used for one of the inner tube or outer cover or one of the layers when the inner tube and outer cover are composed of pluralities of layers, as substances which can be used together, vulcanized rubbers such as NBR, IIR, EPDM, thermoplastic elastomer compositions such as polyamide elastomers, polyester elastomers, polyolefin elastomers, PP/EPDM thermoplastic elastomer compositions may be mentioned. Among these, vulcanized rubber requires a vulcanization step, and therefore, there are few merits in the work process. Among the thermoplastic elastomer compositions, superior flexibility PP/EPDM thermoplastic elastomer compositions are preferred.

In the hose of the present invention, the reinforcing layer is not particularly limited. One formed as a braid or one formed as a spiral may be used. Further, the material used may be a yarn or a wire. As the reinforcing yarn, yarns made from vinylon fibers, rayon fibers, polyester fibers, nylon fibers, aromatic polyamide fibers, etc. may be mentioned by way of example. Explaining the above fibers in more detail, as the polyester fiber, a polyethylene terephthalate (made by Toray Industries Inc., Tetron) may be mentioned. This is generally suitable for use. As the nylon fiber, nylon 6 or nylon 66 made by Asahi Chemical Co., Ltd., Leona) etc. may be mentioned. Further, as the reinforcing wire, hard steel wire may be mentioned. More specifically, steel wire plated with brass or zinc etc. for imparting rustproofness and bondability may be mentioned. When bonding the reinforcing layer, inner tube, and outer cover by high-frequency induction heating, it is necessary to use wire in the reinforcing layer.

The hose according to the present invention may, for example, be produced in the following way.

The thermoplastic elastomer composition 2 of the present invention is extruded onto a mandrel 1 coated in advance with a release agent so as to form a hose inner tube. Next, when necessary, a bonding layer 3 is coated or laid in the form of a sheet or formed by a cross-head extruder on the inner tube for bonding with the reinforcing layer 4, then a braider is used to braid one or more layers of a reinforcing yarn or reinforcing steel wire. A bonding layer of an adhesive etc. may also be provided between the reinforcing layers. When necessary, after the braiding, a bonding layer 5 of an adhesive etc. is formed for bonding with the outer cover. A thermoplastic elastomer composition 6 for the outer cover is extruded to form the outer cover using a cross-head extruder suited for extruding the composition for outer cover on this.

Note that, as the bonding layer provided on the inner tube and reinforcing layer or between reinforcing layers, an acid-modified polyolefin resin or isocyanate, phenol resin, epoxy resin, and urethane adhesive may be used. If the inner tube, reinforcing layer, and outer cover are formed in this way, when the mandrel is finally pulled out, the oil resistant hose of the present invention is obtained. In this process of production, a mandrel is used when producing the hose, but since there is no vulcanization step as required when producing an ordinary rubber hose or hose of a composite rubber/resin structure, there is no compressive deformation due to the heat at the time of vulcanization and deformation due to the pressure at the time of vulcanization, therefore the dimensional precision of the hose is easy to maintain and thus production is of course possible without use of a mandrel other than when strict dimensional precision is required.

In the thermoplastic elastomer composition of the second aspect of the present invention, as the thermoplastic polyolefin resin (A) used as the continuous phase, a homo or copolymer of an olefin, that is, a homo or copolymer of ethylene, propylene, 1-butene, 1-pentene, 3-methyl-butene, 1-hexene, 3-methyl-1-pentene, 4-methyl-1-pentene, 1-octene, and the like may be mentioned. These may be used alone or in mixtures of two or more types.

Specifically, an isotactic, syndiotactic, or random or block copolymer with ethylene etc. or other polypropylene resin (PP), high density polyethylene (HDPE), low density polyethylene (LDPE), linear low density polyethylene (L-LDPE), or other polyethylene resin or ethylene-ethyl acrylate copolymer (EEA), ethylene-methyl acrylate copolymer (EMA), or other general polyolefin resin may be used.

Of these, in particular as the polypropylene resin, a polypropylene homopolymer, propylene-ethylene block copolymer containing 2 to 60% by weight of ethylene, a propylene-ethylene random copolymer containing 0.5 to 20% by weight of ethylene, etc. may be mentioned. The melt flow rate of these polymers is 0.1 to 100 g/10 min, preferably 0.5 to 50 g/10 min. Problems arise in processability if the melt flow rate is smaller than 0.1 g/10 min or larger than 100 g/10 min.

The epoxy group-containing ethylene-acrylic ester copolymer rubber (B) used in the present invention comprises (a) ethylene and (b) an acrylic ester. Methacrylic ester is included in (b) acrylic esters, but these are esters comprised of $C_1$ to $C_8$ alcohols. Specifically, methyl acrylate, methyl methacrylate, ethyl acrylate, ethyl methacrylate, butyl acrylate, butyl methacrylate, t-butyl acrylate, t-butyl methacrylate, 2-ethylhexyl acrylate, 2-ethylhexyl methacrylate, etc. may be given as examples. These may be used alone or in mixtures of two or more types.

The ratio of the (a) ethylene and (b) acrylic ester or methacrylic ester in the epoxy-group-containing ethylene-acrylic ester copolymer rubber (B) used in the present invention is, by molar ratio, 50 to 85:50 to 15, preferably 58 to 80:42 to 20.

If the content of the (b) acrylic ester or methacrylic ester exceeds 50 mol %, the embrittlement point becomes higher, and therefore, use, as an elastomer, at a low temperature becomes difficult. Further, if the content is less than 15 mol %, an elasticity sufficient for a copolymer elastomer is not obtained.

The content of the epoxy groups in the epoxy group-containing ethylene-acrylic ester copolymer rubber (B) is 0.05 to 5 mol % based upon the sum of the moles of (a) and (b), preferably 0.1 to 3 mol %.

Note that the above component (B) may be used alone or in combinations of two or more types.

When the epoxy group is used as a cross-linking site, a polycarboxylic acid etc. may be used as the cross-linking agent, but where a peroxide is used to dynamically cross-link the rubber component, the epoxy group of the component (B) reacts with the resin component or later described compatibilizer and contributes to the compatibilization. The ethylene sites of the component (B) and other components react with the peroxide and function as cross-linking sites.

The acrylonitrile-butadiene rubber used in the present invention is a copolymer synthetic rubber of acrylonitrile and butadiene. The amount of the acrylonitrile is generally 15 to 53% by weight in the copolymer resin, but if the amount of the acrylonitrile increases, the freeze resistance falls, so in the present invention, an acrylonitrile butadiene rubber with an amount of acrylonitrile of 25% by weight to 35% by weight (medium nitrile to medium high nitrile) in range may be preferably used.

Further, it is possible to use a multiple copolymer comprising a combination of acrylonitrile and butadiene plus a third monomer. For example, a carboxylated nitrile rubber with a carboxylic acid introduced into its side chain, divinylbenzene, ethylene glycol dimethacrylate, or other polyfunctional monomer may be introduced for use as a self cross-linking type.

Further, part of the butadiene may be substituted by isoprene.

In the present invention, the rubber component comprises the epoxy-group-containing ethylene-acrylic ester copolymer rubber component (B) and acrylonitrile-butadiene rubber component (D), but these rubber components form dispersed phases in the thermoplastic elastomer composition of the present invention. As the state of dispersion of the components (B) and (D), due to the relationships of the viscosities and compatibilities, three states can be mentioned: [1] the two independently forming domains, [2] the component (D) forming a domain surrounded by (B), and [3] the component (B) forming a domain surrounded by (D). Of these, from the standpoint of the heat resistance, weatherability, oil resistance, and low temperature properties, it is preferable that [2] the acrylonitrile-butadiene rubber component (D) form a domain surrounded by the epoxy-group-containing ethylene-acrylic ester copolymer rubber component (B).

Since the resin component (A) and rubber components (B) and (D) of the present invention are inherently incompatible, the compatibility may be raised by adding an acid-modified polyolefin resin (C). The acid modified polyolefin resin (C) used in the present invention is the above-mentioned polyolefin resin modified with maleic anhydride, fumaric acid, etc. In particular, a maleic acid-modified polypropylene resin is preferred. In the present invention, the component (C) functions as a compatibilizer.

The compatibilizer (C) of the present invention reacts with the epoxy groups of the rubber component, that is, the component (B), to form a graft or block polymer. This lowers the surface tension of the rubber component and facilitates mixing with the resin component.

The amounts of the components (A), (B), (C), and (D) blended (ratios by weight) are, when (A)+(B)+(C)+(D)=100 parts by weight, [(A)+(C)]/[(B)+(D)]=70/30 to 20/80, preferably [(A)+(C)]/[(B)+(D)]=50/50 to 20/80, particularly preferably 40/60 to 25/75. By compounding these in these ranges, it is possible to obtain a thermoplastic elastomer composition having a balance of physical properties.

Further, the ratio of the component (C) based upon the components (A)+(C) may be 0%, but is preferably 1 to 50% by weight, particularly preferably 1 to 30% by weight. This is because it is possible to make the resin component (A) and the rubber components (B) and (D) sufficiently compatible.

The ratio by weight of (B) and (D) in the rubber component is (B)/(D)=10/90 to 90/10, preferably (B)/(D)=20/80 to 30/70, particularly preferably (B)/(D)=30/70 to 50/50. This is to obtain a balance of the heat aging characteristics, the weatherability, the low temperature properties, and the oil resistance of the thermoplastic elastomer composition obtained.

To disperse the acrylonitrile-butadiene rubber component (D) in the thermoplastic elastomer composition of the present invention, as a domain, in a state surrounded by the epoxy group-containing ethylene-acrylic ester copolymer rubber component (B), the volume fraction (φ) and viscosity (η) of the continuous phase, that is, the matrix resin (components (A) and (C)), and the rubber dispersed phase (components (B) and (D)) and of the epoxy group-containing ethylene-acrylic ester copolymer rubber component (B) and acrylonitrile-butadiene rubber component (D) in the rubber phase are made to satisfy the following relations:

$$(\phi_{B+C}/\phi_{A+D})/(\eta_{A+D}/\eta_{B+C}) \leq 1$$

and $$(\phi_C/\phi_B)/(\eta_B/\eta_C) \leq 1$$

where, $\phi_{B+D}$: Volume fraction of mixture of component (B) and component (D)

$\phi_{A+C}$: Volume fraction of mixture of component (A) and component (C)

$\eta_{A+C}$: Melt viscosity of mixture of component (A) and component (C) under mixing temperature and shear rate conditions $\eta_{B+C}$: Melt viscosity of mixture of component (B) and component (D) under mixing temperature and shear rate conditions The volume rate shows the ratio of a phase in the overall volume by the volume fraction in the case where the overall volume is 1, that is, $\phi_A+\phi_B+\phi_C+\phi_D=\phi_{B+D}+\phi_{A+C}=1$. The viscosity is the viscosity measured by a capillary rheometer. The viscosity of the resin phase ($\eta_{A+C}$) and the viscosity of the rubber phase ($\eta_{B+D}$) show the viscosities when the components (A) and (C) or components (B) and (D) are homogeneously mixed and form compositions. Note that the volume and viscosity are defined by the temperature at the time of mixing.

The cross-linking agent usable in the present invention is not particularly limited. Any cross-linking agent normally used for NBR (D) and EMA (B) may be used. As the cross-linking agent for NBR, for example, as a sulfur vulcanization agent, powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 parts by weight per 100 parts by weight of the elastomer.

Further, as an organic peroxide cross-linking agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di (peroxybenzoate), etc. may be mentioned. For example, 1 to 15 parts by weight or so based upon 100 parts by weight of the elastomer may be used.

Further, as a phenol resin cross-linking agent, a bromide of an alkylphenol resin or a mixed cross-linking agent system containing stannous chloride, chloroprene, or other halogen donor and an alkylphenol resin may be mentioned. For example, 1 to 20 parts by weight based upon 100 parts by weight of the elastomer may be used.

In addition, zinc oxide (5 parts by weight or so), magnesium oxide (4 parts by weight or so), lyserge (10 to 20 parts by weight or so), p-quinone dioxime, p-dibenzoyl quinone dioxime, tetrachloro-p-benzoquinone, poly-p-dinitrosobenzene (2 to 10 parts by weight or so), and methylene dianiline (0.2 to 10 parts by weight or so) may be exemplified.

Further, if necessary, a cross-linking accelerator may be added. As the cross-linking accelerator, an aldehyde-ammonia, guanidine, thiazole, sulfenamide, thiuram, dithio acid salt, thiurea, or other general cross-linking accelerator may be added, for example, in 0.5 to 2 parts by weight or so.

Specifically, there may be mentioned, as an aldehyde-ammonia cross-linking accelerator, hexamethylenetetramine etc.;

as a guanidine cross-linking accelerator, diphenylguanidine etc.;

as a thiazole cross-linking accelerator, dibenzothiazoyldisulfide (DM), 2-mercaptobenzothiazole and its Zn salt, cyclohexylamine salt, 2-(4'-morpholinodithio) benzothiazole, etc.;

as a sulfenamide cross-linking accelerator, cyclohexylbenzothiazolyl-sulfenamide (CBS), N-oxydiethylenebenzothiazoyl-2-sulfenamide, N-t-butyl-2-benzothiazolesulfenamide, 2-(thymolpolynyldithio) benzothiazole, etc.;

as a thiuram cross-linking accelerator, tetramethylthiuramdisulfide (TMTD), tetraethylthiuramdisulfide, tetramethylthiurammonosulfide (TMTM), dipentamethylenethiuramtetrasulfide, etc.;

as the dithio acid salt cross-linking accelerator, Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, pipecoline pipecoryl dithiocarbamate, etc.; and as the thiurea cross-linking accelerator, ethylenethiurea, diethylthiurea, etc.

Further, as the cross-linking acceleration aid, a general rubber aid may be used at the same time. For example, zinc oxide (5 parts by weight or so), stearic acid or oleic acid and the Zn salts thereof (2 to 4 parts by weight or so) etc. may be used.

Further, for the epoxy group-containing ethylene-acrylic ester copolymer rubber component (B), organic peroxides, organic ammonium salts, dithiocarbamates, polyamine acids, phenol resins, organic carboxylic acids, etc. may be mentioned. Among these, it is preferable to use organic peroxides able to efficiently cross-link both the acrylonitrile-butadiene component (D) and epoxy-group-containing ethylene-acrylic ester copolymer rubber component (B).

As the peroxide used as the cross-linking agent in the present invention, an organic peroxide having a one-minute half life (half life of one minute) of at least 150° C. is preferably used. Specifically, 1,1-bis(t-butylperoxy) cyclohexane, 2,2-bis(4,4-di-t-butylperoxycyclohexyl) propane, 1,1-bis(t-butylperoxy)cyclododecane, t-hexylperoxyisopropylmonocarbonate, t-butylperoxymaleic acid, t-butyperoxy-3,5,5-trimethylhexanoate, t-butylperoxylaurate, 2,5-dimethyl-2,5-di(m-toluylperoxy)hexane, t-butylperoxyisopropylmonocarbonate, t-butylperoxy2-ethylhexylmonocarbonate, t-hexylperoxybenzoate, 2,5-dimethyl-2,5-di(benzoylperoxy)hexane, t-butylperoxyacetate, 2,2-bis(t-butylperoxy)butane, t-butylperoxybenzoate, n-butyl-4,4-bis(t-butylperoxy) valerate, di-t-butylperoxyisophthalate, $\alpha,\alpha'$ bis(t-butylperoxy)diisopropylbenzene, dicumylperoxide, 2,5-dimethyl-2,5-di(t-butylperoxy)hexane, t-butylcumylperoxide, di-t-butylperoxide, p-menthanehydroperoxide, 2,5-dimethyl-2,5-di(t-butylperoxy)hexine-3, diisopropylbenzenehydroperoxide, t-butyltrimethylsilylperoxide, 1,1,3,3-tetramethylbutylhydroperoxide, cuminhydroperoxide, t-hexylhydroperoxide, t-butylhydroperoxide, etc. may be mentioned. If an organic peroxide having a decomposition temperature for obtaining a one-minute half life of less than 150° C. is used, the polyolefin ends up decomposing, and therefore the cross-linking of the rubber is not sufficient.

Further, the composition of the present invention may have further added to it, if necessary, a cross-linking accelerator, filler, plasticizer, softening agent, anti-aging agent, or other compounding agent.

The thermoplastic elastomer composition of the present invention is preferably a thermoplastic elastomer composition which is produced by dynamic cross-linking, that is causing cross-linking of the rubber while mixing the thermoplastic resin and rubber composition, that is, dynamically advancing the cross-linking. By using this process of production, the thermoplastic elastomer composition obtained ends up comprised of a thermoplastic resin phase, at least part of which forms a continuous phase, in which is finely dispersed a cross-linked rubber phase, at least part of which forms a discontinuous phase, therefore the obtained thermoplastic elastomer composition exhibits behavior similar to that of cross-linked rubber. Since at least the continuous phase is a thermoplastic resin, when molding, processing in accordance with the thermoplastic resin becomes possible.

In the process for production of the thermoplastic elastomer composition of the present invention, the machinery used for the mixing of the components (A), (B), (C), and (D) is not particularly limited, but a screw extruder, kneader, Banbury mixer, twin-screw kneader/extruder, etc. may be mentioned. Among these, considering the mixing of the component (A) (resin component), components (B) and (D) (rubber compositions), and component (C) (compatibilizer) and the dynamic cross-linking of the components (B) and (D), use of a twin-screw kneader/extruder is preferred. Further, it is possible to use two or more types of kneaders and successively mix the mixture.

Next, an example of the process of production will be illustrated in more detail based on mixing by a twin-screw kneader/extruder as is generally performed.

First, the pelletized components (A) and (C) are charged from a first charging port of the twin-screw kneader/extruder, mixed by the twin screws, and heated and melted.

On the other hand, the components (B) and (D) are mixed using a Banbury mixer or other rubber use kneader added with, if necessary, a reinforcing agent, anti-aging agent, processing aid, etc. to obtain a so-called master batch not containing a cross-linking system, then pelletized by a rubber use pelletizer. The components (B) and (D) may be separately pelletized, but it is preferable that the components (B) and (D) be mixed and pelletized together so that the component (B) surrounds the component (D).

As explained above, the component (A) is heated and melted by the twin-screw kneader/extruder, then the thus pelletized components (B) and (D) are charged from a second charging port of the twin-screw kneader/extruder to cause the components (B) and (D) to disperse in the component (A).

Next, a cross-linking agent or further a cross-linking aid are charged from a third (fourth) charging port of the twin-screw kneader/extruder to crosslink the components (B) and (D) (dynamically cross-link) under mixing.

By performing the cross-linking in this way, the cross-linking can be performed in a state with the components (B) and (D) sufficiently dispersed in the component (A) and with the components (B) and (D) sufficiently fine in state, and therefore, a thermoplastic elastomer composition comprising a component (A) forming a continuous phase (matrix) is which is stably dispersed components (B) and (D) as a dispersed phase (domain) is prepared. In such a thermoplastic elastomer composition, the particle size of the cross-linked rubber composition forming the dispersed phase (particles containing component (B) or (D) alone or components (B) and (D)) is preferably not more than 50 $\mu$m, more preferably 10 to 1 $\mu$m.

When compounding agents such as a filler, softening agent, anti-aging agent, is added to the composition of the present invention, the compounding agents for the components (B) and (D) may be added during the above mixing, but compounding agents other than the cross-linking agent may also be premixed before the above mixing. The compounding agents for the component (A) may be premixed before the above mixing or may be added during the above mixing.

The conditions for the melting and mixing of the component (A), component (B), component (C), and component (D) are a mixing temperature of for example 150 to 250° C., particularly preferably 150 to 200° C., and a shear rate at the time of mixing of 500 to 7000 sec$^{-1}$, particularly preferably 500 to 2000 sec$^{-1}$.

The time of the overall melt mixing is 30 seconds to 10 minutes, while the cross-linking time after the cross-linking agent is added is preferably 15 seconds to 5 minutes.

The thermoplastic elastomer composition thus obtained of the present invention is superior in flexibility, heat resistance, oil resistance, and low temperature properties. The application of the thermoplastic elastomer composition of the present invention is not particularly limited, but the composition is suitably used when oil resistance and heat resistance are required. For example, it is suitably used for parts used near automobile or construction machinery engines requiring oil resistance and heat resistance.

Figure 2:
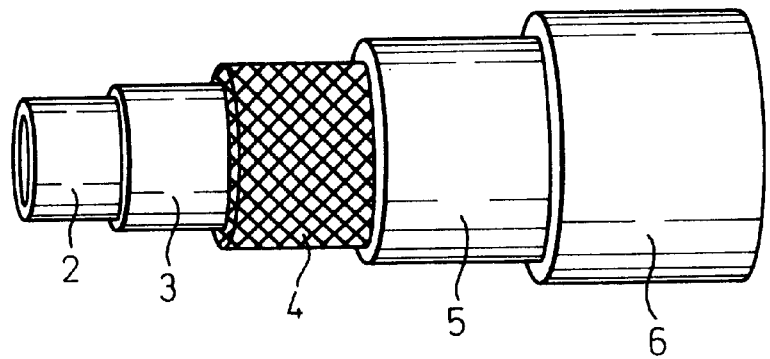
FIG. 2 is a perspective view of another example of the hose of the present invention.

The hose of the second aspect of the present invention will be explained next based on an embodiment shown in the attached drawings. FIG. 2 is a perspective view of the hose of the present invention showing the layers exposed. The hose has an inner tube 2, reinforcing layer 4, and outer cover 6 and has bonding layers 3 and 5 between the reinforcing layer and inner tube and between the reinforcing layer and outer cover. The inner tube 2 of the present invention is characterized by including the thermoplastic elastomer composition of the present invention.

In the hose of the present invention, for the bonding layer, a maleic acid-modified polyolefin, in particular a maleic acid-modified propylene, maleic acid-modified polyethylene, etc. may be used.

In the hose of the present invention, when the outer cover or the inner tube composed of a plurality of layers, as the substance which may be used for the other layers when using the thermoplastic elastomer composition of the present invention for some of the layers, vulcanized rubbers such as NBR, IIR, EPDM, thermoplastic elastomer compositions such as polyamide elastomers, polyester elastomers, polyolefin elastomers, PP/EPDM thermoplastic elastomer compositions, may be mentioned. Of these, vulcanized rubber requires a vulcanization step, and therefore, there is little merit in the work process. Among the thermoplastic elastomer compositions, PP/EPDM thermoplastic elastomer compositions superior in flexibility are preferred.

The hose of the present invention is a hose having at least an inner tube, reinforcing layer, and outer cover. The layers may be bonded to each other by bonding layers. The inner tube and the outer cover may each be formed as single layers or multiple layers. One or more reinforcing layers may also be provided.

In the hose of the present invention, the reinforcing layer is not particularly limited. One formed as a braid or one formed as a spiral may be used. Further, the material used may be a yarn or a wire. As the reinforcing yarn, yarns made from vinylon fibers, rayon fibers, polyester fibers, nylon fibers, aromatic polyamide fibers, etc. may be mentioned by way of example. Explaining the above fibers in more detail, as the polyester fiber, a polyethylene terephthalate (made by Toray Industries Ltd, Tetron) may be mentioned. This is generally suitable for use. As the nylon fiber, nylon 6 or nylon 66 made by Asahi Chemical Co., Ltd., Leona) etc. may be mentioned. Further, as the reinforcing wire, hard steel wire may be mentioned. More specifically, steel wire plated with brass or zinc etc. for imparting rustproofness and bondability may be mentioned. When bonding the reinforcing layer, inner tube, and outer cover by high-frequency induction heating, it is necessary to use wire in the reinforcing layer.

Next, the process of production of the hose of the present invention will be explained using an embodiment shown in the attached drawings. FIG. 3 is a schematic view of the production process for an example of the hose of the present invention.

The hose according to the present invention may for example be produced in the following way. That is, as shown in FIG. 3, a thermoplastic elastomer composition for the inner tube is extruded from extruder 8 for an inner tube material onto a mandrel 7 coated in advance with a release agent and simultaneously a bonding layer is extruded onto this from an adhesive extruder 9 to form a tube-like shape in the inner tube molding die 10 and thereby form the inner tube 11. At this time, it is also possible to extrude and form the bonding layer on the inner tube after extruding the inner tube.

Next, a reinforcing layer 13 is formed on the inner tube 11 and the bonding layer using a reinforcing layer forming machine 12. The reinforcing layer 13 is formed by braiding a plurality of reinforcing yarns or reinforcing wires etc. aligned with each other in a spiral or braid.

Next, a high frequency is applied by a high-frequency induction heating apparatus 14 to the hose on which the reinforcing layer 13 has finished being formed so as to locally heat the reinforcing layer 13 for 0.1 to 5 seconds. At this time, when the reinforcing layer 13 is heated to 100 to 350° C., if the bonding layer is a maleic acid-modified polyolefin resin etc., the bonding layer is melted and sufficient bonding becomes possible.

Further, the heating of the wires of the reinforcing material may be performed by hot-air heating or infrared heating in addition to induction heating using a high-frequency oven. Application of heat treatment results in sufficient bonding of the bonding layer and wire and an improvement in the durability of the hose. In particular, if high-frequency induction heating is used, it is possible to partially melt just the surface of the bonding layer in contact with the wire, the reinforcing layer 13 and the bonding layer can be strongly bonded physically and chemically, and there is little deterioration of the material. Further, since the heating and melting are performed instantaneously, there is also the merit of the work efficiency being high.

Finally, in the same way as the inner tube, a bonding layer is extruded from an extruder 16 for a bonding layer on to the sufficiently heated reinforcing layer 13 and simultaneously a thermoplastic elastomer composition for the outer cover is extruded from an outer cover material extruder 17 to form a hose-like shape in the outer cover forming die 15 and thereby form the outer cover 18. When forming the outer cover, it is also possible to first extrude the bonding layer, then extrude the thermoplastic elastomer composition for the outer cover so as to form the outer cover 18. Further, in FIG. 2, the high-frequency induction heating of the reinforcing layer 13 was performed before forming the outer cover 18, but the outer cover 18 and the bonding layer can be strongly bonded in the same way even if this is done after the outer cover 18 is formed.

After forming the hose in this way, the mandrel 7 is pulled out to obtain the desired hose.

By using the above production process, since no vulcanization step is required as when producing a hose such as an ordinary rubber hose, the production process can be simplified and the production of the rubber hose becomes simpler. Further, since no vulcanization step is required, there is no compressive deformation due to the heat at the time of vulcanization, and therefore the dimensional precision of the hose is easy to maintain.

Further, the bonding layer is heated after the reinforcing layer is formed or after the outer cover is formed, but by selecting high-frequency induction heating, it is possible to heat the bonding layer without the heat being bounced off the surface of the wire and lost, and therefore, the work efficiency is better compared with infrared heating, hot-air heating, and other heating methods. Further, the bonding layer can be heated uniformly. However, use of the high-frequency induction heating method is limited to cases of use of wire for the reinforcing layer. When the reinforcing layer is made of organic fiber, if an adhesive such as an isocyanate, phenol resin, epoxy, is provided between the reinforcing layer and the inner tube and outer cover, a sufficient bonding force can be obtained by the heat at the time of the extrusion of the outer cover without special heat treatment such as induction heating.

The hose of the present invention obtained in this way uses the thermoplastic elastomer composition of the present invention for at least the inner tube, therefore is superior in heat aging characteristics, oil resistance, and low temperature properties.

Next, a third aspect of the present invention will be explained in future detail.

The hose of the present invention is a hose having at least an inner tube, reinforcing layer, and outer cover with the layers bonded to each other with bonding layers. The inner tube and the outer cover may each be formed as single layers or multiple layers. One or more reinforcing layers may also be provided.

The hose of the present invention will be explained next based on an embodiment shown in the attached drawings. FIG. 2 is a perspective view of the hose of the present invention showing the layers exposed. The hose has an inner tube 2, reinforcing layer 4, and outer cover 6 and has bonding layers 3 and 5 between the reinforcing layer and inner tube and between the reinforcing layer and outer cover. The inner tube 2 and the outer cover 6 of the hose of the present invention contain a thermoplastic elastomer composition comprised of a thermoplastic resin in which an at least partially cross-linked elastomer component is dispersed. The reinforcing layer 4 is composed of brass-plated wire formed into a braid. The bonding layers 5 and 6 between the inner tube and the outer cover and reinforcing layer contain a maleic acid-modified polyolefin resin.

The thermoplastic elastomer composition contained in the inner tube 2 and the outer cover 6 is not particularly limited so long as it is a thermoplastic elastomer composition composed of a thermoplastic resin matrix phase in which an elastomer component which is at least partially cross-linked is dispersed.

As the thermoplastic resin usable as the thermoplastic resin matrix phase, it is possible to use various types of thermoplastic resins or their compositions. That is, it may be a single thermoplastic resin or composition or compositions composed of mixtures of the same.

Specifically, polyolefin resins (for example, high density polyethylene (HDPE), ultrahigh molecular weight polyethylene (UHMWPE), isotactic polypropylene, syndiotactic polypropylene, and ethylene-propylene copolymer resin), polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, nylon 66/PPS copolymers), polyester resins (for example, polybutylene terephthalate (PBT), polyethylene terephthalate (PET), polyethylene isophthalate (PEI), PET/PEI copolymers, polyacrylate (PAR), polybutylene naphthalate (PBN), liquid crystal polyesters, polyoxyalkylene diimide acid/polybutyrate terephthalate copolymers, and other aromatic polyesters), polynitrile resins (for example, polyacrylonitrile (PAN), polymethacrylonitrile, acrylonitrile/styrene copolymers (AS), methacrylonitrile/styrene copolymers, methacrylonitrile/styrene/butadiene copolymers), polymethacrylate resins (for example, polymethyl methacrylate (PMMA), polyethyl methacrylate), polyvinyl resins (for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methylacrylate copolymers), cellulose resins (for example, cellulose acetate and cellulose acetate lactate), fluorine resins (for example, polyvinylidene fluoride (PVDF), polyvinyl fluoride (PVF), polychlorotrifluoroethylene (PCTFE), tetrafluoroethylene/ethylene copolymers (ETFE)), imide resins (for example, aromatic polyimides (PI)), thermoplastic elastomers (for example, styrene elastomers, olefin elastomers, polyester elastomers, urethane elastomers), etc. may be mentioned.

The elastomer component dispersed in the thermoplastic resin matrix phase is at least partially cross-linked.

The elastomer component includes diene rubbers and their hydrates (for example, NR, IR, epoxylated natural rubber, SBR, BR (high cis-BR and low cis-BR), NBR, hydrogenated NBR, hydrogenated SBR), olefin rubbers (for example, ethylene propylene rubbers (EPDM, EPM), maleic acid-modified ethylene propylene rubber (M-EPM), IIR, isobutylene and aromatic vinyl or diene monomer copolymers, acrylic rubbers (ACM), halogenated rubbers (for example, Br-IIR, Cl-IIR, brominated isobutylene-paramethyl styrene copolymers (Br-IPMS), CR, chlorohydrin rubber (CHR), chlorosulfonated polyethylene (CSM), chlorinated polyethylene (CM), maleic-acid-modified chlorinated polyethylene (M-CM), silicone rubbers (for example, methyl vinyl silicone rubber, dimethyl silicone rubber, methyl phenyl vinyl silicone rubber), sulfonated rubbers (for example, polysulfide rubber), fluororubbers (for example, vinylidene fluoride rubbers, fluoro vinyl ether rubbers, tetrafluoroethylene-propylene rubbers, fluorosilicone rubbers, fluorophosphagen rubbers), and thermoplastic elastomers (for example, styrene elastomers, olefin elastomers, ester elastomers, urethane elastomers, polyamide elastomers).

In particular, EPM rubbers and EPDM rubbers (or rubber compositions containing the same) and other olefin rubbers (compositions) are suitably used due to their excellent heat stability in the mixing by the process of production of the thermoplastic elastomer composition of the present invention explained later and in the molding by extrusion or injection molding using the thermoplastic elastomer composition of the present invention.

Among these, in particular, copolymers or terpolymer composed of ethylene and propylene or further some diene components such as dicyclopentadiene, ethylidene norbonene, 1,4-hexadiene, etc., that is, EPM and/or EPDM, and further maleic acid-modified EPM and/or EPDM composed of EPM and/or EPDM modified with maleic acid etc. can be suitably used. Specifically, Mitsui EPT4070 made by Mitsui Petrochemicals Industries, Ltd. and other commercially available products can be used.

The elastomer component in the thermoplastic elastomer composition of the present invention is at least partially cross-linked. The method of cross-linking the elastomer component is not particularly limited and may be any conventionally known method, but, for example, it is possible to melt and mix the thermoplastic resin component and the elastomer component not including the cross-linking agent by a twin-screw kneader/extruder etc., add the cross-linking agent for cross-linking the elastomer component, while dispersing the elastomer component, as a dispersed phase (domain) in the thermoplastic resin matrix phase, whereby cross-linking dynamically during the mixing. Further, as the dynamic cross-linking is caused, in addition to the above method, it is also possible to cause cross-linking at the temperature of 150 to 300° C. using a sulfur, organic peroxide, metal oxide, phenol resin, quinone dioxime, or other cross-linking agent.

The type of the cross-linking agent and the dynamic cross-linking conditions (temperature and time) etc. may be suitably set in accordance with the composition of the elastomer component and are not particularly limited.

As the cross-linking agent, the above may be used. More specifically, as a sulfur vulcanization agent, powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 parts by weight per 100 parts by weight of the elastomer.

Further, as an organic peroxide cross-linking agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di (peroxylbenzoate), etc. may be mentioned. For example, 1 to 15 parts by weight or so based upon 100 parts by weight of the elastomer may be used.

Further, as a phenol resin cross-linking agent, a bromide of an alkylphenol resin or a mixed cross-linking agent system containing stannous chloride, chloroprene, or other halogen donor and an alkylphenol resin may be mentioned. For example 1 to 20 parts by weight based upon 100 parts by weight of the elastomer may be used.

In addition, zinc oxide (5 parts by weight or so), magnesium oxide (4 parts by weight or so), lyserge (10 to 20 parts by weight or so), p-quinonedioxime, p-dibenzoylquinonedioxime, tetrachloro-p-benzoquinone, poly-p-dinitrosobenzene (2 to 10 parts by weight or so), and methylenedianiline (0.2 to 10 parts by weight or so) may be exemplified.

Further, if necessary, a cross-linking accelerator may be added. As the cross-linking accelerator, an aldehyde-ammonia, guanidine, thiazole, sulfenamide, thiuram, dithio acid salt, thiourea, or other general cross-linking accelerator may be added, for example, in 0.5 to 2 parts by weight or so.

Specifically, there may be mentioned, as an aldehyde-ammonia cross-linking accelerator, hexamethylenetetramine etc.;

as a guanidine cross-linking accelerator, diphenylguanidine etc.;

as a thiazole cross-linking accelerator, dibenzothiazoyld-isulfide (DM), 2-mercaptobenzothiazole and its Zn salt, cyclohexylamine salt, 2-(4'-morpholinodithio) benzothiazole, etc.;

as a sulfenamide cross-linking accelerator, cyclohexyl-benzothiazolylsulfenamide (CBS), N-oxydiethylenebenzothiazoyl-2-sulfenamide, N-t- butyl-2-benzothiazolesulfenamide, 2-(thymolpolynyldithio)benzothiazole, etc.;

as a thiuram cross-linking accelerator, tetramethylthiuramdisulfide (TMTD), tetraethylthiuramdisulfide, tetramethylthiurammonosulfide (TMTM), dipentamethylenethiuramtetrasulfide, etc.;

as the dithio acid salt cross-linking accelerator, Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, pipecoline pipecoryl dithiocarbamate, etc.; and as the thiurea cross-linking accelerator, ethylenethiurea, diethylthiurea, etc.

Further, as the cross-linking acceleration aid, a general rubber aid may be used at the same time. For example, zinc oxide (5 parts by weight or so), stearic acid or oleic acid and their Zn salts (2 to 4 parts by weight or so) etc. may be used.

Further, the elastomer component may have further added to it, if necessary, an anti-aging agent, an antioxidant, an ultraviolet light absorber, a pigment, dye, or other coloring agent, another plasticizer, carbon black, silica, or other filler, etc.

The compounding agents for the thermoplastic resin component and the elastomer component (except for the cross-linking agent) may be added during the mixing of the thermoplastic resin component and the elastomer component or may be premixed before mixing.

The ratio of the thermoplastic resin component forming the thermoplastic resin matrix phase of the thermoplastic elastomer composition and elastomer component is not particularly limited, but preferably the elastomer component is 10 to 90% by weight of the weight of the thermoplastic resin. If the amount of the thermoplastic resin blended is large, the flexibility of the obtained thermoplastic elastomer composition falls. Conversely, if too small, the melt flow rate of the thermoplastic elastomer composition falls and molding becomes difficult. If further excessively small, the thermoplastic resin component serving as the continuous phase cannot be physically surrounded by the elastomer component forming the dispersed phase (domain) and mixing tends to become difficult.

The thermoplastic elastomer composition may have further added to it a petroleum softening agent or a plasticizer generally called a process oil or extender oil. The petroleum softening agent is used for reducing the viscosity of the polymer used at the time of processing, reducing the hardness of the product after cross-linking or after processing, and controlling the high temperature and low temperature properties and other physical properties. The petroleum softening agent is obtained by refining of heavy oil and may be roughly classified by differences in the components contained into alkyl aromatic oils, alkyl naphthenic oils, and paraffin oils. Suitable ones of these or mixtures of these should be used depending on the type of the thermoplastic resin component and elastomer component in relation to the compatibility with the polymer used.

Further, as one mode of the process oil, in general, as a plasticizer used for the rubber and thermoplastic resin, a high boiling point ester or a liquid compound with a chemical structure similar to that of the polymer used may be suitably used.

As these plasticizers, dioctyl phthalate (DOP), dibutyl phthalate (DBP), diisodecyl phthalate (DIDP), diisononyl phthalate (DINP), dioctyl adipate (DOA), and other so-called phthalate ester plasticizers; or epoxidized soybean oil, epoxidized fatty acid esters, and other epoxy plasticizers; chlorinated fatty acid esters, chlorinated paraffin, and other chlorinated plasticizers; tricresyl phosphate (TCP), tri-β-chloroethyl phosphate (TCEP), and other phosphorus plasticizers; dioctyl adipate (DOA), didecyl adipate (DDA), and other adipic acid plasticizers, dibutyl sebacate (DBS) and other sebacic acid plasticizers; dioctyl azelate (DOZ) and other azelaic acid plasticizers; triethyl citrate (TEC) and other citric acid plasticizers; polypropylene adipate (PPA) and other polyethylene plasticizers may be suitably used individually or in a blended state.

The plasticizer or softening agent is not particularly limited so long as it has heat resistance, but preferably a low volatility plasticizer or softening agent with a heat loss, shown by JIS K6220, of not more than 1% at 100° C.×3 hours is preferred as exhibiting excellent properties when heated. As the softening agent or plasticizer having such a property, any of the above softening agents or plasticizers which satisfy the above heat loss requirement may be used. Particularly preferably a high boiling point aromatic softening agent, paraffin softening agent, naphthene softening agent, and DIDP, DTDP, and other phthalic acid plasticizers, epoxidized soybean oil and other epoxy plasticizers and TCEP and other phosphorus family plasticizers may be suitably used.

The above process oil may be added in an amount of 5 to 100 parts by weight, preferably 5 to 80 parts by weight, based upon 100 parts by weight of the total of the thermoplastic resin component and the elastomer component. If the amount is less than 5 parts by weight, a sufficient flexibility is not obtained, while if over 100 parts by weight, the mixing of the thermoplastic resin component and the elastomer component becomes difficult.

Aside from the above, when, for example, the compatibilities of the thermoplastic resin component and the elastomer component in the thermoplastic elastomer composition of the present invention differ, the two can be made compatible by using a compatibilizer. By mixing a compatibilizer in the system, the surface tension between the thermoplastic resin component and the elastomer component falls and as a result the particles of the elastomer dispersed phase become fine in size, and therefore, so the properties of the two components can be more effectively expressed. As such a compatibilizer, it is possible to use a copolymer having the structure of both or one of the thermoplastic resin component and elastomer component or a structure of a copolymer having an epoxy group, carbonyl group, halogen group, amino group, oxazoline group, hydroxy group, etc. reactible with the thermoplastic resin component or elastomer component. These may be selected based on the type of the thermoplastic resin component or elastomer component mixed, but the ordinarily used ones are styrene-ethylene-butylene block copolymers (SEBS) and their maleic acid-modified forms, maleic acid-modified EPM and EPDM, EPDM-styrene or EPDM-acrylonitrile graft copolymers and their maleic acid-modified forms, styrene/maleic acid copolymers, reactive phenoxy resins, etc.

The thermoplastic elastomer composition may have further added to and mixed with it, if necessary, a vulcanization accelerator, an anti-aging agent, an antioxidant, an ultraviolet light absorber, a pigment, dye, or other coloring agent, another plasticizer, carbon black, silica, or other filler, and processing aids.

The reinforcing layer in the hose of the present invention uses a brass-plated wire. The brass-plated wire may for example be braided or spiraled.

The brass-plated wire of the reinforcing layer is preferably treated by a sulfur-containing triazine compound of the following formula:

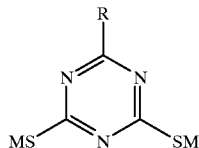

In the formula, R is —OR', —SR', —NHR', or —N(R')$_2$, R' is H, an alkyl group, alkenyl group, phenyl group, phenylalkyl group, alkylphenyl group, or cycloalkyl group, M is H, Na, Li, K, ½ Mg, ½ Ba, ½ Ca, aliphatic primary, secondary, or tertiary amine, quaternary ammonium salt, or phosphonium salt.

Specifically, 1,3,5-triazine-2,4,6-trithiol, 1,3,5,-triazine-2,4,6-trithiol•diethanolamine, 6-dibutylamino-1,3,5-triazine-2,4-dithiol, 6-dibutylamino-1,3,5-triazine-2,4-dithiol•monoethylenediamine, 6-dibutylamino-1,3,5-triazine-2,4-dithiol•monoethanolamine, etc. may be mentioned.

If the surface of the brass-plated wire is treated with the above sulfur-containing triazine compound, the corrosion resistance of the wire and the bondability with the elastomer composition are improved. The method of treating the surface of the brass-plated wire by the above sulfur-containing triazine compound (hereinafter referred to as the "triazine treatment") is not particularly limited. The conventional known method disclosed in Japanese Examined Patent Publication (Kokoku) No. 7-122225 etc. may be used. For example, the method of drawing the wire in a lubricant containing the sulfur-containing triazine compound, the method of immersing the wire and a counter electrode in a solution of the sulfur-containing triazine compound and applying a voltage across the same, etc. may be mentioned.

The hose of the present invention has a bonding layer containing a maleic acid-modified polyolefin family thermoplastic resin between the reinforcing layer and the inner tube and between the reinforcing layer and the outer cover. Further, to improve the durability of the hose, when there are a plurality of reinforcing layers, it is possible to provide a bonding layer containing the maleic acid-modified polyolefin family thermoplastic resin of the present invention at least at one of the reinforcing layers.

Here, as the modified polyolefin resin, for example, an isotactic, syndiotactic, or ethylene etc. random or block copolymer or other polypropylene resin (PP), high density polyethylene (HDPE), low density polyethylene (LDPE), linear low density polyethylene (L-LDPE), or other polyethylene resin or ethylene-ethyl acrylate copolymer (EEA), ethylene-methyl acrylate copolymer (EMA), or other general polyolefin resin may be used.

The method of modifying these polyolefin resins with maleic acid or maleic anhydride is not particularly limited. This may be done by conventionally known methods. For example, however, a maleic acid-modified polypropylene resin may be obtained by using a single-screw extruder or a twin-screw kneader/extruder, adding to the polypropylene the maleic acid or maleic anhydride and a peroxide, and mixing the same for a grafting reaction. The rate of modification by the maleic acid is preferably 0.1 to 10% by weight converted into maleic acid groups.

To obtain a suitable bond in the present invention, it is preferable that the maleic acid-modified form of the polyethylene resin have a melt index, measured under measurement conditions of 190° C., a load of 2.16 kgf, an orifice of 1 mm, and 10 minutes, of not more than 30 g/10 minutes. The melt flow index is more preferably 20 to 0.5/10 minutes.

As the bonding layer of the present invention, it is possible to use, in addition to a maleic acid-modified polyolefin thermoplastic resin, an epoxy-modified polyolefin resin and polyester resin in a blend. The ratio of the blended resins may be suitably determined within a range not impairing the effect of the maleic acid-modified polyolefin thermoplastic resin.

Next, the process of production of a hose of the present invention will be explained with reference to an embodiment shown in the attached drawings. FIG. 3 is a schematic view of the production process of the hose of the present invention.

The hose of the present invention may be produced, for example, as follows: That is, as shown in FIG. 2, a thermoplastic elastomer composition for the inner tube is extruded from an inner tube material extruder 8 onto a mandrel 7 coated in advance with a release agent and simultaneously a bonding layer is extruded onto this from an adhesive extruder 9 to form a tube-like shape in the inner tube molding die 10, whereby the inner tube 11 is formed. At this time, it is also possible to extrude and form the bonding layer on the inner tube after extruding the inner tube.

Next, a reinforcing layer 13 is formed on the inner tube 11 and the bonding layer using a reinforcing layer forming machine 12. The reinforcing layer 13 is formed by braiding a plurality of brass-plated wires etc. aligned with each other in a spiral or braid. The brass-plated wires are preferably treated by a sulfur-containing triazine compound before braiding. If this triazine treatment is performed, the corrosion resistance of the wire and the bondability of the wire with the elastomer composition are further improved.

Next, a high frequency is applied by a high-frequency induction heating apparatus 14 to the hose on which the reinforcing layer 13 has finished being formed so as to locally heat the reinforcing wires of the reinforcing layer 13 for 0.1 to 5 seconds. At this time, the reinforcing layer 13 composed of the brass-plated wire is heated to 100 to 350° C., the bonding layer is made to melt, whereby sufficient bonding becomes possible.

Further, the heating of the wires of the reinforcing material may be performed by hot-air heating or infrared heating in addition to induction heating using a high-frequency oven. Application of heat treatment results in sufficient bonding of the bonding layer and wire and an improvement in the durability of the hose. In particular, if high-frequency induction heating is used, it is possible to partially melt just the surface of the bonding layer in contact with the wire, the reinforcing layer 13 and the bonding layer can be strongly bonded physically and chemically, and there is little deterioration of the material. Further, since the heating and melting are performed instantaneously, there is also the merit of the work efficiency being high.

Finally, in the same way as the inner tube, a bonding layer is extruded from a bonding layer extruder 16 on to the sufficiently heated reinforcing layer 13 and simultaneously a thermoplastic elastomer composition for the outer cover is extruded from an outer cover material extruder 17 to form a hose-like shape in the outer cover forming die 15 and thereby form the outer cover 18. When forming the outer cover, it is also possible to first extrude the bonding layer, then extrude the thermoplastic elastomer composition for the outer cover so as to form the outer cover 18. Further, in FIG. 2, the high-frequency induction heating of the brass-plated wire reinforcing layer 13 was performed before forming the outer cover 18, but the outer cover 18 and the bonding layer can be strongly bonded in the same way even if this is done after the outer cover 18 is formed.

After forming the hose in this way, the mandrel 7 is pulled out to obtain the desired hose.

The hose of the present invention obtained by the above production process has the following characteristics.

In the process of production of the hose of the present invention, since no later vulcanization step is required as with a hose such as an ordinary rubber hose, the production process can be simplified and the production of the rubber hose becomes simpler. Further, since no later vulcanization step is required, there is no compressive deformation due to the heat at the time of vulcanization, therefore the dimensional precision of the hose is easy to maintain.

Since the inner tube and the outer cover are not plastic but use a flexible thermoplastic elastomer composition, the hose is flexible even if hard wire braid is used for the reinforcing layer.

Since a maleic acid-modified polyolefin thermoplastic resin is used for the bonding layer, the bonds of the inner tube and the outer cover with the reinforcing layer are strong and the durability is excellent.

By using brass-plated wire, which has a higher hardness than the conventionally used zinc-plated wire, the durability of the hose is improved. Further, by treating the surface of the brass-plated wire with a sulfur-containing triazine compound, the corrosion resistance of the wire and the bondability of the wire with the inner tube and outer cover and durability of the hose are further improved.

The bonding layer is heated after the reinforcing layer is formed or after the outer cover is formed, but by selecting high-frequency induction heating, it is possible to heat the bonding layer without the heat being bounced off the surface of the wire and lost and therefore the work efficiency is better compared with infrared heating, hot-air heating, and other heating methods. Further, the bonding layer can be heated uniformly.

EXAMPLES

The present invention will be explained below with reference to Examples, but the present invention is of course not limited in scope to these Examples.

Examples I-1 to I-6 and Comparative Examples I-1 to I-2

The various elastomer compositions shown in the following Table I-1 were prepared in the following way using resin components, rubber components, compatibilizers, and cross-linking agents and other various compounding agents.

Process of Production of Elastomer Composition

First, the rubber component and the compounding agents other than the cross-linking agent were charged into an internal rubber-use Banbury mixer, mixed, and then pelletized by a rubber-use pelletizer.

Next, the resin component, pelletized rubber component, and compatibilizer were charged into a twin-screw kneader/extruder and mixed, then the cross-linking agent was continuous charged, whereby the rubber component dispersed as a domain in a matrix comprising the resin component and compatibilizer is dynamically cross-linked.

The mixing conditions were a mixing temperature of 180° C. and a shear rate of 1000 sec$^{-1}$. After the end of the dynamic vulcanization, the mixture was continuously extruded from the twin-screw kneader/extruder in the form of strands. These were then water cooled, then cut by a cutter to lengths of about 3 mm (diameter approximately 2 mm) to obtain a pelletized thermoplastic elastomer composition.

The various thermoplastic elastomer compositions obtained were measured according to a JIS K6301 method for their hardness, tensile strength, elongation, and compression set and were measured for cross-linking degree by Soxhlet extraction. Further, they were measured according to a JIS K6301 method for heat aging characteristics by a hot air aging test (120° C., 336 hours) and for oil resistance by an immersion test (120° C., 336 hours). The results are shown in Table I-1. In the Table, the amounts of the components of the formulation are parts by weight.

TABLE I-1

|  | Examples | | | | | | Comp. Ex. | |
| --- | --- | --- | --- | --- | --- | --- | --- | --- |
|  | I-1 | I-2 | I-3 | I-4 | I-5 | I-6 | I-1 | I-2 |
| Formulation components | | | | | | | | |
| Ethylene-acrylic ester copolymer-1 | 60.0 | 60.0 | 60.0 | 60.0 | 60.0 | 60.0 | 60.0 | — |
| Ethylene-acrylic ester copolymer-2 | — | — | — | — | — | — | — | 60.0 |
| Polypropylene (homopolymer) | 28.0 | 28.0 | — | 14.0 | 28.0 | 28.0 | 40.0 | 28.0 |
| Polypropylene (block polymer) | — | — | 28.0 | — | — | — | — | — |
| Polypropylene (P.E.R.) | — | — | — | 14.0 | — | — | — | — |
| Maleic acid-modified polypropylene | 12.0 | 12.0 | 12.0 | 12.0 | 12.0 | 12.0 | — | 12.0 |
| Plasticizer (paraffin oil) | — | 6.0 | 6.0 | 6.0 | 6.0 | — | — | — |
| Cross-linking agent (organic peroxide) | 3.6 | 3.6 | 3.6 | 3.6 | 1.8 | 0.5 | 3.6 | 3.6 |
| Antioxidant | 1.0 | 1.0 | 1.0 | 1.0 | 1.0 | 1.0 | 1.0 | 1.0 |
| Physical properties | | | | | | | | |
| Hardness | 88 | 84 | 80 | 75 | 88 | 82 | 84 | 84 |
| Tensile strength (MPa) | 8.6 | 8.1 | 8.0 | 7.5 | 8.1 | 4.5 | 8.2 | 8.1 |
| Elongation (%) | 320 | 400 | 440 | 550 | 430 | 250 | 110 | 100 |
| Compression set (%) | 48 | 44 | 40 | 37 | 65 | 95 | 45 | 44 |
| Gelation rate (%) | 92 | 88 | 95 | 95 | 86 | 13 | 88 | 90 |

TABLE I-1-continued

|  | Examples | | | | | | Comp. Ex. | |
|---|---|---|---|---|---|---|---|---|
|  | I-1 | I-2 | I-3 | I-4 | I-5 | I-6 | I-1 | I-2 |
| Heat aging | | | | | | | | |
| Retention of tensile strength (%) | 91.1 | 90.0 | 92.3 | 93.2 | 91.3 | 30.0 | 20.5 | 25.0 |
| Retention of elongation (%) | 77.3 | 80.5 | 82.3 | 70.1 | 73.2 | 25.1 | 11.0 | 11.0 |
| Oil resistance | | | | | | | | |
| Retention of tensile strength (%) | 70.3 | 72.5 | 71.3 | 65.8 | 71.8 | 31.0 | 13.3 | 12.0 |
| Retention of elongation (%) | 68.2 | 70.0 | 67.0 | 63.2 | 65.0 | 21.0 | 10.0 | 10.0 |

The notes to Table I-1 are as follows:
Ethylene-acrylic ester copolymer I-1: Esprene EMA2752 (made by Sumitomo Chemical Co., Ltd.), containing epoxy groups.
Ethylene-acrylic ester copolymer I-2: Esprene EMA2152 (made by Sumitomo Chemical Co., Ltd.), not containing epoxy groups.
Polypropylene (homopolymer): RD121D (made by Tokuyama Corporation)
Polypropylene (block polymer of propylene and ethylene): RD610 (made by Tokuyama Corporation)
Polypropylene (P.E.R.): M552E (made by Tokuyama Corporation)
Maleic acid-modified polypropylene: Admer QB540 (made by Mitsui Petrochemicals Industries, Ltd.)
Plasticizer (paraffin family oil): Sunpar 2280 (made by Nippon Sun Sekiyu)
Cross-linking agent (organic peroxide): Parkadox 14/40 (made by Kayaku Akzo Corporation)
Antioxidant: Irganox 1010 (made by Ciba-Geigy Japan)

Comparative Example I-1 did not use a maleic acid-modified polypropylene, and therefore, the compatibility was poor and the elongation insufficient. Comparative Example I-2 used an ethylene-acrylic ester copolymer rubber not having any epoxy groups, and therefore the compatibility was poor and the elongation insufficient.

Examples I-7 to I-9, Comparative Example I-3, and Prior Art Example I-1

Preparation of Hose

As shown in Table I-2, as the inner tube material, Examples I-2 and I-3, Comparative Example I-1, and acrylonitrile butadiene rubber were extruded onto mandrels. Brass-plated wire (diameter 0.25 mm) was then braided over each to form reinforcing layers. Next, outer covers composed of a PP/EPDM thermoplastic elastomer (Santoprene 101-73, AES Co.), the Example I-2 material, and a chloroprene rubber were extruded to form hoses. These were designated as Examples I-7 to I-9, Comparative Example I-3, and Prior Art Example I-1.

In Examples I-7 to I-9 and Comparative Example I-3, as the adhesive for the inner tube and reinforcing layer and for the reinforcing layer and the outer cover, a maleic acid-modified polypropylene (Admer QB540 (made by Mitsui Petrochemicals Industries, Ltd.)) was used. The adhesive was applied by extrusion in two layers for the inner tube and the outer cover.

After the outer covers were extruded, the hoses were passed through a high-frequency oven to be treated to bond the inner tubes with the reinforcing layers and the outer covers with the reinforcing layers by induction heating. The conditions at that time were a secondary power of the high-frequency oven of 15 kw, a heating temperature of 180° C., and a line speed of 5 m/min.

For Prior Art Example I-1, after formation, the hose was vulcanized at 150° C. and 20 kg/cm$^2$ for 45 minutes.

The hoses prepared by the above method had inner diameters of 9 mm and thicknesses of the inner tube and outer cover of 1.5 mm and 1.0 mm respectively.

TABLE I-2

|  | Ex. I-7 | Ex. I-8 | Ex. I-9 | Comp. Ex. I-3 | Prior Art I-1 |
|---|---|---|---|---|---|
| Inner tube | Ex. I-2 material | Ex. I-2 material | Ex. I-3 material | Comp. Ex. I-1 material | NBR rubber |
| Outer cover | PP/EPDM material | Ex. I-2 material | PP/EPDM material | PP/EPDM material | CR rubber |
| Reinforcing material | Brass-plated wire | Brass-plated wire | Brass-plated wire | Brass-plated wire | Brass-plated wire |
| Adhesive | Maleic acid-modified PP | Maleic acid-modified PP | Maleic acid-modified PP | Maleic acid-modified PP | Vulcanization bonding |
| Hose durability (impulse test) | Good | Good | Good | 170,000X | Good |

TABLE I-2-continued

|  | Ex. I-7 | Ex. I-8 | Ex. I-9 | Comp. Ex. I-3 | Prior Art I-1 |
| --- | --- | --- | --- | --- | --- |
| Hose flexural rigidity | 101 | 102 | 100 | 108 | 100 |
| Work steps | 80 | 80 | 80 | 80 | 100 |

The formulation of the acrylonitrile-butadiene rubber and chloroprene rubber used in Prior Art Example I-1 is shown in Table I-3.

TABLE I-3

|  | Inner tube use (NBR) | Outer cover use (CR) |
| --- | --- | --- |
| NBR[1] | 100 | — |
| CR[2] | — | 100 |
| GPF[3] | 60 | 60 |
| Stearic acid[4] | 2 | 2 |
| Paraffin process oil[5] | — | 20 |
| DOP[6] | 20 | — |
| ZnO[7] | 3 | 4.5 |
| Sulfur[8] | 2 | — |
| TT[9] | 1 | — |
| NA22[10] | — | 1 |

[1] Nipol 1043 (made by Nippon Zeon Co., Ltd.)
[2] CRP-W (made by Showa Denko Dupont)
[3] Seast V (made by Tokai Carbon Co., Ltd.)
[4] Bis Stearic Acid NY (made by NOF Corporation)
[5] Machine Oil 22 (made by Showa Shell Sekiyu K.K.)
[6] Di-2-ethylhexyl phthalate (made by Chisso Petrochemical Corporatoin)
[7] Zinc White No. 3 (made by Seido Chemical Industry Co., Ltd.)
[8] Powdered sulfur (made by K.K. Karuizawa Seirensho)
[9] Noccelar-TT-PO (made by Ouchi Shinko Chemical Industrial Co., Ltd.)
[10] Sanmix 22-80E (made by Sanshin Chemical Industry Co., Ltd.)

Physical Properties of Hoses

The hoses of Examples I-7 to I-9, Comparative Example I-3, and Prior Art Example I-1 were evaluated for the following items. The results are shown in Table I-2.

(1) Hose Durability

The hoses were tested according to an SAE J188 Type 1. As the oil, automatic transmission use oil (made by Idemitsu Kosan Co., Ltd.) was used. Impulse pressure was repeatedly applied under conditions of 100° C. and a pressure of 140 kg/cm$^2$. The test was stopped when an abnormality occurred in the hose and the number of impulses was shown in Table I-2. For hoses which failed to show any abnormality after 1 million impulses, the test was stopped and a "good" rating given.

(2) Hose Flexural Rigidity

The hoses were bent along arcs of predetermined radii and the bending force measured. The measurement started from a bending radius of 10 times (10D) the outer diameter of the hoses, then the bending radius was successively changed up to 3D and the bending force measured (n=2).

The method was adopted of reading the value at the time of the prescribed radius (4D) from the curve plotting the relationship between the bending force and the bending radius obtained.

The data is the load by which the hoses of the Examples and Comparative Examples similarly deform expressed as relative values indexed to the value of the hose prepared by Prior Art Example I-1 as 100.

(3) Work Steps

The numbers of production steps of the hoses of the Examples and Comparative Examples were expressed as relative values indexed to the work steps for producing the hose of Prior Art Example I-1 as 100.

As explained above, according to the first aspect of the present invention, by using a thermoplastic elastomer composition, comprised of a thermoplastic polyolefin family resin in which is dispersed an epoxy-group-containing ethylene-acrylic ester copolymer rubber which is cross-linked by a peroxide, as a hose, it is possible to obtain a hose superior in durability and flexibility with fewer work steps than a rubber hose.

Examples II-1 to II-11 and Comparative Examples II-1 to II-3

Preparation of Thermoplastic Elastomer

Various types of elastomer compositions shown in the following Table II-1 were prepared as explained below using resin components, rubber components, compatibilizers, and cross-linking agents and other various compounding agents.

First, the rubber component, the additives other than the cross-linking agent, and other compounding materials were mixed by an internal rubber-use Banbury mixer at 50 to 140° C. for 5 minutes to prepare a rubber master batch. Next, the master batch was pelletized by a rubber pelletizer. The obtained rubber pellets and resin pellets were charged into a twin-screw extruder where they were melted and mixed. The mixing conditions were 200° C., approximately 3 minutes time, and a shear rate of 1000 sec$^{-1}$. The cross-linking was performed dynamically in the extruder. The material was continuously extruded from the extruder in strands, water cooled, then cut by a cutter to obtain the pelletized thermoplastic elastomer composition.

The various obtained thermoplastic elastomer compositions were then measured for hardness, tensile strength, and elongation according to a JIS K6301 method, for heat aging characteristics by a hot air aging test (120° C., 336 hours), for low temperature properties by a low temperature impulse embrittlement test (−40° C.), and for oil resistance by an immersion test (120° C., 336 hours). Here, the low temperature properties measured by the embrittlement test (−40° C.) were evaluated as being in three stages A, B, and C. These were as follows:

A: No abnormalities

B: Whitening

C: Cracking and breakage

The results of the evaluation are shown in the following Table II-1. The amounts in the formulations in the table are parts by weight.

Note that the compositions of Example II-11 and Example II-3 are the same, but in Example II-3, the components (B) and (D) were mixed first, then the mixing and cross-linking with the resin performed, while in Example II-11, the component (B) and component (D) were separately mixed with the resin and cross-linked, then the two mixed.

TABLE II-1

| Composition | Examples | | | | | | | | | | | Comp. Ex. | | |
|---|---|---|---|---|---|---|---|---|---|---|---|---|---|---|
| | II-1 | II-2 | II-3 | II-4 | II-5 | II-6 | II-7 | II-8 | II-9 | II-10 | II-11 | II-1 | II-2 | II-3 |
| (B) EMA | 63 | 49 | 35 | 21 | 35 | 49 | 49 | 49 | 49 | 21 | 35 | 7 | 59.5 | — |
| (D) | | | | | | | | | | | | | | |
| NBR-1 | 7 | 21 | 35 | 49 | — | 21 | 21 | 21 | 21 | 9 | 35 | 3 | 25.5 | 70 |
| NBR-2 | — | — | — | — | 35 | — | — | — | — | — | — | — | — | — |
| CB | 17.5 | 17.5 | 17.5 | 17.5 | 17.5 | 17.5 | 17.5 | 17.5 | 17.5 | 7.5 | 17.5 | 2.5 | 21.25 | 17.5 |
| Oil | 7 | 7 | 7 | 7 | 7 | 7 | 7 | 7 | 7 | 3 | 7 | 0.1 | 8.5 | 7 |
| Antioxidant | 1 | 1 | 1 | 1 | 1 | 1 | 1 | 1 | 1 | 0.1 | 1 | 0.1 | 1 | 1 |
| Processing aid | 0.35 | 0.35 | 0.35 | 0.35 | 0.35 | 0.35 | 0.35 | 0.35 | 0.35 | 0.1 | 0.35 | 0.1 | 0.35 | — |
| Cross-linking agent | 1 | 1 | 1 | 1 | 1 | 1 | 1 | 1 | 1 | 0.4 | 1 | 0.1 | 1 | 1 |
| (D) | | | | | | | | | | | | | | |
| Homo PP | 27 | 27 | 27 | 27 | 27 | — | — | 30 | 20 | 63 | 27 | 81 | 14.55 | 30 |
| Block PP | — | — | — | — | — | 27 | — | — | — | — | — | — | — | — |
| Random PP | — | — | — | — | — | — | 27 | — | — | — | — | — | — | — |
| (C) | | | | | | | | | | | | | | |
| MAH mod. PP | 3 | 3 | 3 | 3 | 3 | 3 | 3 | — | 10 | 7 | 3 | 9 | 0.45 | — |
| Organic peroxide | 1 | 1 | 1 | 1 | 1 | 1 | 1 | 1 | 1 | 0.4 | 1 | 0.1 | 1.2 | 1 |
| (B) + (D)/(A) + (C) | 70/30 | 70/30 | 70/30 | 70/30 | 70/30 | 70/30 | 70/30 | 70/30 | 70/30 | 30/70 | 70/30 | 10/90 | 85/15 | 70/30 |
| (B)/(D) | 90/10 | 70/30 | 50/50 | 30/70 | 50/50 | 70/30 | 70/30 | 70/30 | 70/30 | 70/30 | 50/50 | 70/30 | 70/30 | 0/100 |

| Physical properties | Examples | | | | | | | | | | | Comp. Ex. | | |
|---|---|---|---|---|---|---|---|---|---|---|---|---|---|---|
| | II-1 | II-2 | II-3 | II-4 | II-5 | II-6 | II-7 | II-8 | II-9 | II-10 | II-11 | II-1 | II-2 | II-3 |
| physical properties | | | | | | | | | | | | | | |
| Hardness | 76 | 80 | 83 | 85 | 83 | 78 | 77 | 79 | 80 | 91 | 82 | 99 | mixing impos- sible | 85 |
| TB (MPa) | 13.8 | 14.5 | 15.8 | 16.5 | 16.3 | 12.2 | 10.5 | 10.6 | 16.3 | 18.8 | 14.1 | 22.3 | | 17.2 |
| EB (%) | 360 | 350 | 330 | 300 | 320 | 410 | 420 | 250 | 390 | 460 | 220 | 490 | | 130 |
| Low temp. properties (−40° C.) | A | A | A | A | A | A | A | A | A | A | B | C | | C |
| Retention after heat aging (120° C. × 336 hr) | | | | | | | | | | | | | | |
| TB retention (%) | 72.3 | 71.8 | 71.3 | 70.2 | 70.5 | 74.2 | 76.1 | 70.1 | 70.9 | 86.4 | 70.2 | 95.5 | | 68 |
| EB retention (%) | 68.5 | 68.1 | 67.8 | 65.1 | 66.0 | 72.5 | 74.2 | 66.7 | 68.3 | 76.9 | 42.7 | 92.0 | | 36.4 |
| Oil resistance (120° C. × 72 h) | | | | | | | | | | | | | | |
| Swell (%) | 20 | 17 | 14 | 10 | 11 | 25 | 28 | 28 | 18 | 9 | 18 | 5 | | 10 |

The notes to Table II-1 are as follows:
EMA: Esprene EMA2752 (ethylene-acrylic ester copolymer, made by Sumitomo Chemical Co., Ltd.), containing epoxy groups
NBR-1 (acrylonitrile 28%): Perbunan NT2865 (made by Bayer)
NBR-2 (acrylonitrile 33%): Nipol DN206 (made by Nippon Zeon Co., Ltd.)
CB: HTC-100 (made by Chubu Carbon Co., Ltd.)
Oil: ADK Cizer C-9N (made by Asahi Denka Kogyo K. K.)
Anti-aging agent: Irganox 1010 (made by Ciba-Geigy Japan)
Processing aid: Armeen 18D (made by Lion Akzo Co., Ltd.)
Cross-linking agent: Daiso DAP (made by Osaka Soda K. K.)
Homo-PP: Tokuyama Polypro RB121D (polypropylene homopolymer, made by Tokuyama Corporation)
Block PP: Tokuyama Polypro RB610 (polypropylene block polymer, made by Tokuyama Corporation)
Random PP: Tokuyama Polypro RS511Y (polypropylene random polymer, made by Tokuyama Corporatioin)
Mah-mod. PP: Admer QB540 (maleic acid-modified polypropylene, made by Mitsui Petrochemicals Industries, Ltd.)
Cross-linking agent (organic peroxide): Parkadox 14/40 (made by Kayaku Akzo Corporation)

Comparative Example II-1 had too much of a resin component, so the hardness of the resultant thermoplastic elastomer composition was too high and the low temperature properties inferior. Comparative Example II-2 had too much of a rubber component, therefore mixing was impossible. Comparative Example II-3 had no component (B) blended in it, so was inferior in heat aging characteristics and low temperature properties.

Examples II-12 to II-15, Comparative Examples II-4 to II-5, and Prior Art Example Preparation of Hoses As shown in Table II-2, as the inner tube material, Examples II-2, II-6, and II-11, Comparative Examples II-1 and II-3, and acrylonitrile-butadiene rubber were extruded onto mandrels. Next, brass-plated wire (diameter 0.25 mm) was braided over them to form reinforcing layers. Next, outer cover materials comprised of PP/EPDM family thermoplastic elastomers (Santoprene 101-73, made by AES), the material of Example II-6, or chloroprene rubber was extruded over these to prepare hoses. These were designated as Examples II-12 to II-15, Comparative Examples II-4 to II-5, and the Prior Art Example.

Examples II-12 to II-15 and Comparative Examples II-4 and II-5 used maleic acid-modified polypropylene (Admer QB540, made by Mitsui Petrochemicals Industries, Ltd.) as the adhesive between the inner tube and reinforcing layer and the reinforcing layer and outer cover. The adhesive was applied in two layers, that is, for the inner tube and the outer cover.

After the outer covers were extruded, the hoses were passed through a high-frequency oven for bonding the inner tube/reinforcing layer and the outer cover/reinforcing layer by the induction heating method. The conditions at this time were a secondary power of the high-frequency oven of 15 kw, a heating temperature of 180° C., and a line speed of 5 m/min.

Further, the Prior Art Example was vulcanized after formation at 150° C. and 20 kg/cm² for 45 minutes.

The hoses prepared by the above method had an internal diameter of 9 mm and a thickness of the inner tube and outer cover of 1.5 mm and 1.0 mm, respectively.

Physical Properties of Hoses

The hoses of Examples II-12 to II-15, Comparative Examples II-4 and II-5, and the Prior Art Example were evaluated for the following items. The results are shown in Table II-2.

(1) Impulse Durability (JIS K6330)

The hoses were tested according to SAE J188 Type 1. As the oil, automatic transmission use oil (made by Idemitsu Kosan Co., Ltd.) was used. Impulse pressure was repeatedly applied under conditions of 100° C. and a pressure of 140 kg/cm². For hoses which failed to show any abnormality after 1 million impulses, the test was stopped and a "good" rating given.

(2) Hose Flexibility (Ordinary Temperature and −40° C.)

The hoses were bent along arcs of predetermined radii at ordinary temperature and −40° C. and the bending force measured. The measurement started from a bending radius of 10 times (10D) the outer diameter of the hoses, then the bending radius was successively changed up to 3D and the bending force measured (n=2).

The method was adopted of reading the value at the time of the prescribed radius (4D) from the curve plotting the relationship between the bending force and the bending radius obtained.

The data is the load by which the hoses of the Examples and Comparative Examples similarly deform expressed as relative values indexed to the value of the hose prepared by the Prior Art Example as 100. The smaller the value, the higher the flexibility.

(3) Work Steps

The numbers of production steps of the hoses of the Examples and Comparative Examples were expressed as relative values indexed to the work steps for producing the hose of Prior Art Example II-1 as 100.

TABLE II-2

|  | Example | | | | Comp. Ex. | | Prior Art Ex. |
| --- | --- | --- | --- | --- | --- | --- | --- |
|  | II-12 | II-13 | II-14 | II-15 | II-4 | II-5 | II |
| Structure |  |  |  |  |  |  |  |
| Inner tube material | Ex. II-2 | Ex. II-6 | Ex. II-6 | Ex. II-11 | Comp. Ex. II-1 | Comp. Ex. II-3 | NBR |
| Outer cover material | EPDM/PP | EPDM/PP | Ex. II-6 | EPDM/PP | EPDM/PP | EPDM/PP | CR |
| Physical properties |  |  |  |  |  |  |  |
| Impulse durability | Good | Good | Good | Good | Good | Good | Good |
| Flexibility (ordinary temp.) | 91 | 91 | 94 | 103 | 253 | 105 | 100 |
| Low temp. flexibility (−40° C.) | 86 | 86 | 88 | 95 | 260 | 112 | 100 |
| Work steps | 80 | 80 | 80 | 80 | 80 | 80 | 100 |

As explained above, according to the second aspect of the present invention, it is possible to obtain a thermoplastic elastomer composition and hose having excellent weatherability, heat aging characteristics, oil resistance, flexibility, and low temperature properties.

Examples III-1 to III-6

Preparation of Thermoplastic Elastomer

The thermoplastic elastomer composition (ACM/COPE) of the formulation shown in Table III-1 was prepared in the following way using a rubber composition, thermoplastic copolyester elastomer, compatibilizer, and cross-linking agent. In the table, the units are "parts by weight".

TABLE III-1

| Thermoplastic copolyester elastomer[1] | 70 |
| --- | --- |
| Rubber composition | 30 |
| Cross-linking agent BTC[3] | 0.33 |
| Compatibilizer[4] | 5.0 |

[1] Hytrel 5556, made by Du Pont.
[2] ACM/stearic acid/FEF grade carbon black/antiaging agent (Irganox 1010, made by Ciba-Geigy Japan) = 100/2/40/3.3 (ratio by weight)
[3] Butane tetracarboxylic acid, made by Mitsui Toatsu Fine Chemicals Inc.
[4] Bondfast 7L, made by Sumitomo Chemical Co., Ltd.

The rubber composition was prepared by charging ACM, stearic acid, carbon black, and an anti-aging agent in an internal rubber-use Banbury mixer, mixing them, then forming a sheet using a rubber-use roll, and pelletizing the same by a rubber-use pelletizer.

Next, the thermoplastic copolyester elastomer, pelletized rubber, and compatibilizer were charged in a twin-screw kneader/extruder where they were sufficiently mixed, then a cross-linking agent was continuously charged so as to dynamically cross-link the rubber component dispersed as a domain in a matrix comprised of the thermoplastic copolyester elastomer.

The mixing conditions were a mixing temperature of 250° C. and a shear rate of 1000 $sec^{-1}$. After the end of the dynamic vulcanization, the mixture was continuously extruded from the twin-screw kneader/extruder in the form of strands. These were then water cooled, then cut by a cutter to lengths of about 3 mm (diameter approximately 2 mm) to obtain a pelletized thermoplastic elastomer composition.

Preparation of Hoses

Example III-1

The above prepared thermoplastic elastomer composition (ACM/COPE) comprised of the copolymer polyester resin in which was dispersed cross-linked acrylic rubber and an adhesive were extruded in two layers on a polyester mandrel to form an inner tube (inner diameter of 9.5 mm). A brass-plated wire (diameter 0.25 mm) was braided on this to form a reinforcing layer. This was then heated by infrared rays. The temperature of heating by the infrared rays was 140° C. and the line speed was 0.5 m/min. On the heated reinforcing layer were extruded two layers, that is, an adhesive and a thermoplastic elastomer composition (EPDM/PP, Santoprene 101-73, made by AES) comprised of the polypropylene resin in which was dispersed a partially cross-linked ethylene-propylene-diene copolymer rubber, to form the outer cover (outer diameter of 16.9 mm). Note that a maleic acid-modified polypropylene resin was used for the bonding layer between the inner tube and reinforcing layer and the outer cover and reinforcing layer.

Example III-2

A hose was prepared in the same way as in Example III-1 except that for the inner tube, use was made of a thermoplastic elastomer composition (NBR/PP, Geolast 701-70, made by AES) comprised of a polypropylene resin in which was dispersed a partially cross-linked acrylonitrile-butadiene rubber.

Example III-3

A hose was prepared in the same way as in Example III-1 except that the same NBR/PP elastomer composition used in Example III-2 for the inner tube was used, a maleic acid-modified high density polyethylene (HDPE) resin was used for the bonding layer, and induction heating by a high-frequency oven was performed as the heating method. Note that the secondary power of the high-frequency oven was 15 kw, the heating temperature was 180° C., and the line speed was 5 m/min.

Example III-4

A hose was prepared in the same way as in Example III-1 except that use was made of the same NBR/PP elastomer composition used in Example III-2 for the inner tube, a maleic acid-modified linear low density polyethylene (LLDPE) resin was used for the bonding layer, and hot-air heating was performed as the heating method. Note that the heating temperature by the hot-air heating was 120° C. and the line speed was 1 m/min.

Example III-5

A hose was prepared in the same way as in Example III-1 except that use was made of the same NBR/PP elastomer composition used in Example III-2 for the inner tube and triazine-treated brass-plated wire was used for the reinforcing layer.

Example III-6

A hose was prepared in the same way as in Example III-5 except that the reinforcing layer was heated by induction heating at a secondary power of 15 kw and a line speed of 5 m/min. The durability and flexural rigidity of the resultant hose were substantially the same in value as in Example III-5, but the induction heating of Example III-6 gave a sufficient bond between the reinforcing layer and other layers through the bonding layer in 1/10th the time of the infrared heating of Example III-5.

Prior Art Example III-1

An inner tube (inner diameter of 9.5 mm) of acrylonitrile-butadiene rubber was extruded over a mandrel, then brass-plated wire (diameter 0.25 mm) was braided to form a reinforcing layer. Next, an outer cover comprised of chloroprene rubber (outer diameter of 16.9 mm) was extruded. This assembly was then vulcanized and bonded under conditions of 150° C. (20 $kg/cm^2$)×45 minutes.

Comparative Example III-1

Two layers, that is, nylon 11 (Rilsan BESNOTL, made by Atochem) and an adhesive, were extruded to form an inner tube (inner diameter of 9.5 mm), then zinc-plated wire (diameter of 0.25 mm) was braided to form a reinforcing layer. Next, this was induction heated by a high-frequency oven in the same way as Example III-3. Two layers, that is, an adhesive and polyurethane (Esten 58311, made by Kyowa Hakko Kogyo Co., Ltd.), were then extruded to form an outer cover (outer diameter of 16.9 mm). Note that a maleic acid-modified polypropylene resin was used for the bonding layers between the inner tube and reinforcing layer and the outer cover and reinforcing layer.

Comparative Example III-2

A hose was prepared in the same way as in Comparative Example III-1 except that brass-plated wire (diameter of 0.25 mm) was used for the reinforcing layer and infrared heating was performed as the heating method.

Comparative Example III-3

A hose was prepared in the same way as in Comparative Example III-1 except that use was made of a thermoplastic elastomer composition (NBR/PP) comprised of a polypropylene resin in which is dispersed a partially cross-linked acrylonitrile butadiene rubber for the inner tube and a thermoplastic elastomer composition (EPDM/PP) composed of a polypropylene resin in which is dispersed an at least partially cross-linked ethylene-propylenediene copolymer rubber for the outer cover is used.

Comparative Example III-4

A hose was prepared in the same way as in Comparative Example III-1 except that the same NBR/PP elastomer composition used in Comparative Example III-3 was used for the inner tube, the same EPDM/PP elastomer composition as in Comparative Example III-3 was used for the outer cover, brass-plated wire was used for the reinforcing layer, and polypropylene (PP) resin was used for the bonding layer.

Note that the resins used as the bonding layer in the Examples and Comparative Examples were as follows:

PP: RB121D made by Tokuyama Corporation.

Maleic acid-modified PP: QB540 made by Mitsui Petrochemicals Industries, Ltd.

Maleic acid-modified HDPE: HB500 made by Mitsui Petrochemicals Industries, Ltd.

Maleic acid-modified LLDPE: NB550 made by Mitsui Petrochemicals Industries, Ltd.

Physical Properties of Hoses

The hoses prepared by Examples III-1 to III-6, Prior Art Example III-1, and Comparative Examples III-1 to III-4 were measured and evaluated for the following physical properties:

ing radius of 10 times (10D) the outer diameter of the hoses, then the bending radius was successively changed up to 3D, the bending force measured two times, and the average taken. The method was adopted of reading the value at the time of the prescribed radius (4 times, 4D) from the curve plotting the relationship between the bending force and the radius obtained. The bending forces required for the hoses prepared by Examples III-1 to III-6 and Comparative Examples III-1 to III-4 to deform in the same way were shown as relative values indexed to the bending force at the time of 4D of the hose prepared by Prior Art Example III-1 as 100.

The results are shown in Table III-2.

TABLE III-2

| | Example | | | | | |
|---|---|---|---|---|---|---|
| | III-1 | III-2 | III-3 | III-4 | III-5 | III-6 |
| Inner tube | ACM/COPE | NBR/PP | NBR/PP | NBR/PP | NBR/PP | NBR/PP |
| Outer cover | EPDM/PP | EPDM/PP | EPDM/PP | EPDM/PP | EPDM/PP | EPDM/PP |
| Reinforcing layer | Brass-plated wire | Brass-plated wire | Brass-plated wire | Brass-plated wire | Brass-plated wire, triazine treated | Brass-plated wire, triazine treated |
| Bonding layer | Maleic acid-modified PP | Maleic acid-modified PP | Maleic acid-modified HDPE | Maleic acid-modified LLDPE | Maleic acid-modified PP | Maleic acid-modified PP |
| Method of bonding wire and bonding layer | Infrared heating | Infrared heating | Induction heating | Hot air heating | Infrared heating | Induction heating |
| Evaluation | | | | | | |
| Durability | 104 | 102 | 104 | 105 | 124 | 124 |
| Flexural rigidity | 114 | 105 | 107 | 106 | 105 | 105 |

| | Prior Art Ex. | Comp. Ex. | | | |
|---|---|---|---|---|---|
| | III-1 | III-1 | III-2 | III-3 | III-4 |
| Inner tube | NBR rubber | Nylon | Nylon | NBR/PP | NBR/PP |
| Outer cover | CR rubber | Urethane | Urethane | EPDM/PP | EPDM/PP |
| Reinforcing layer | Brass-plated wire | Zinc-plated wire | Brass-plated wire | Zinc-plated wire | Brass-plated wire |
| Bonding layer | Vulcanization bonding | Maleic acid-modified PP | Maleic acid-modified PP | Maleic acid-modified PP | PP |
| Method of bonding wire and bonding layer | Vulcanization bonding | Induction heating | Infrared heating | Induction heating | Induction heating |
| Evaluation | | | | | |
| Durability | 100 | 65 | 67 | 83 | 15 |
| Flexural rigidity | 100 | 150 | 150 | 104 | 108 |

(1) Hose Durability

A durability test was conducted in accordance with SAE J188 Type 1. As the oil, automatic transmission use oil was used. Impulse pressure was repeatedly applied under conditions of 100° C. and a pressure of 140 kg/cm$^2$. The relative values of the number of impulses were found for hoses prepared by Examples III-1 to III-6 and Comparative Examples III-1 to III-4 indexed to the number of impulses where abnormality occurred in a hose prepared by Prior Art Example III-1 as 100.

(2) Hose Flexural Rigidity

The hoses were bent along arcs of predetermined radii (bending radii) and the bending force (load required for bending) measured. The measurement started from a bend- As explained above, according to the third aspect of the present invention, by including in the inner tube and outer cover of a hose a thermoplastic elastomer composition comprising a thermoplastic resin in which is dispersed an at least partially cross-linked elastomer component, it is possible to obtain a superior flexibility compared with a plastic hose. Further, by using a maleic acid-modified polyolefin thermoplastic resin for the bonding layer, a higher bonding force is obtained and the hose durability is improved.

By using triazine-treated brass-plated wire for the reinforcing layer, the bonding force is further improved. By performing high-frequency induction heating as the heating method at the time of production of the hose, it is possible to strongly bond the inner tube and outer cover with the wire without taking much time, so the work efficiency is high.

What is claimed is:

1. A thermoplastic elastomer composition comprising the following components (A), (B), and (C):

Component (A): thermoplastic polyolefin resin

Component (B): epoxy-group-containing ethylene acrylic ester copolymer rubber

Component (C): acid-modified polyolefin resin wherein component (B) is cross-linked by a peroxide and is dispersed in a continuous phase of component (A) as a dispersed phase and wherein a part of the acid modification groups of component (C) react with a part of the epoxy groups of component (B) to form a graft polymer and wherein the ratio of compounding (ratio by weight) (A)+(C)/(B) of the components (A), (B), and (C) is 70/30 to 15/85.

2. A thermoplastic elastomer composition as claimed in claim 1, wherein the thermoplastic olefin resin (A) is at least one resin selected from the group consisting of polypropylene homopolymers and propylene-α-olefin copolymers.

3. A thermoplastic elastomer composition as claimed in claim 1, wherein the epoxy-group-containing ethylene-acrylic ester copolymer rubber (B) is cross-linked at least 80% in the composition.

4. A thermoplastic elastomer composition as claimed in claim 1, wherein the epoxy-group-containing ethylene-acrylic ester copolymer rubber (B) is dynamically cross-linked.

5. A hose using the thermoplastic elastomer composition as claimed in claim 1 as the inner tube and/or outer cover of a hose having an inner tube, at least one reinforcing layer, and an outer cover.

6. A thermoplastic elastomer composition as claimed in claim 1 wherein component (C) is a maleic acid-modified polypropylene resin.

* * * * *